US012764566B2

(12) United States Patent
Christoffersson et al.

(10) Patent No.: US 12,764,566 B2
(45) Date of Patent: Oct. 13, 2026

(54) RADIO RESOURCE CONTROL WIDE AREA CONFIGURATION OF A WIRELESS DEVICE

(71) Applicant: Telefonaktiebolaget LM Ericsson (publ), Stockholm (SE)

(72) Inventors: Jan Christoffersson, Luleå (SE); Mårten Ericson, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 265 days.

(21) Appl. No.: 18/580,034

(22) PCT Filed: Jul. 20, 2021

(86) PCT No.: PCT/EP2021/070304

§ 371 (c)(1),
(2) Date: Jan. 17, 2024

(87) PCT Pub. No.: WO2023/001369

PCT Pub. Date: Jan. 26, 2023

(65) Prior Publication Data

US 2024/0334206 A1 Oct. 3, 2024

(51) Int. Cl.
*H04W 24/02* (2009.01)
*H04W 72/04* (2023.01)

(52) U.S. Cl.
CPC ........... *H04W 24/02* (2013.01); *H04W 72/04* (2013.01)

(58) Field of Classification Search
None
See application file for complete search history.

(56) References Cited

U.S. PATENT DOCUMENTS

2012/0113797 A1* 5/2012 De Pasquale ........ H04B 7/0689 370/216
2015/0215903 A1* 7/2015 Zhao ..................... H04W 72/04 370/329

(Continued)

FOREIGN PATENT DOCUMENTS

CN 104205915 A * 12/2014 .......... H04W 72/542
WO WO-2010086498 A1 * 8/2010 .......... H04W 72/543

(Continued)

OTHER PUBLICATIONS

International Search Report and Written Opinion dated Apr. 12, 2022 for International Application No. PCT/EP2021/070304 filed Jul. 20, 2021; consisting of 14 pages.

(Continued)

*Primary Examiner* — Kodzovi Acolatse
(74) *Attorney, Agent, or Firm* — Weisberg I.P. Law, P.A.

(57) ABSTRACT

A method, core network node, cell node, and wireless device (WD) for radio resource control (RRC) wide area configuration of a WD are disclosed. According to one aspect, a method in a central network node includes configuring a set of cells to be included in a wide area configuration for a WD. The method also includes sending a wide area cell configuration signal to the WD, the wide area cell configuration signal including configurations for each cell in a predefined wide area, the predefined wide area being a collection of cells, the configurations including setup, resume and hand over configurations and resource allocations for an active wide area including a subset of cells of the collection of cells of the predefined wide area.

21 Claims, 12 Drawing Sheets

(56) References Cited

U.S. PATENT DOCUMENTS

| | | | | |
|---|---|---|---|---|
| 2015/0288566 | A1* | 10/2015 | Sadek | H04L 41/0823 370/254 |
| 2020/0252842 | A1 | 8/2020 | Hsieh et al. | |
| 2021/0112475 | A1* | 4/2021 | Kim | H04W 36/0061 |
| 2021/0176682 | A1 | 6/2021 | Guo et al. | |
| 2021/0352720 | A1* | 11/2021 | Babaei | H04W 74/0808 |
| 2022/0039006 | A1* | 2/2022 | Zhou | H04W 76/15 |
| 2022/0046491 | A1* | 2/2022 | Shrestha | H04W 36/0072 |
| 2022/0053388 | A1* | 2/2022 | Kim | H04W 36/0044 |
| 2024/0032070 | A1* | 1/2024 | Zhou | H04W 72/30 |

FOREIGN PATENT DOCUMENTS

| | | | | |
|---|---|---|---|---|
| WO | 2020229552 | A1 | 11/2020 | |
| WO | WO-2021260255 | A1 * | 12/2021 | H04W 48/18 |

OTHER PUBLICATIONS

3GPP TSG-RAN WG2 Meeting #105 R2-1900808; Title: Discussion on the conditional handover procedure; Source: ZTE Corporation, Sanechips; Agenda item: 12.3.3; Document for: Discussion and Decision; Date and Location: Feb. 25-Mar. 1, 2019, Athens, Greece; consisting of 8 pages.

3GPP TS 38.300 V16.6.0; 3rd Generation Partnership Project; Technical Specification Group Radio Access Network; NR; NR and NG-RAN Overall Description; Stage 2 (Release 16); Jun. 2021; consisting of 152 pages.

3GPP TS 38.300 V16.1.0; 3rd Generation Partnership Project; Technical Specification Group Radio Access Network; NR; NR and NG-RAN Overall Description; Stage 2 (Release 16); Mar. 2020; consisting of 133 pages.

3GPP TS 38.423 V16.4.0; 3rd Generation Partnership Project; Technical Specification Group Radio Access Network; NG-RAN; Xn application protocol (XnAP) (Release 16); Jan. 2021; consisting of 457 pages.

3GPP TS 38.331 V16.1.0; 3rd Generation Partnership Project; Technical Specification Group Radio Access Network; NR; Radio Resource Control (RRC) protocol specification (Release 16); Jul. 2020; consisting of 906 pages.

* cited by examiner

RADIO RESOURCE CONTROL WIDE AREA CONFIGURATION OF A WIRELESS DEVICE

CROSS-REFERENCE TO RELATED APPLICATION

This application is a Submission Under 35 U.S.C. § 371 for U.S. National Stage Patent Application of International Application Number: PCT/EP2021/070304, filed Jul. 20, 2021 entitled "RADIO RESOURCE CONTROL WIDE AREA CONFIGURATION OF A WIRELESS DEVICE," the entirety of which is incorporated herein by reference.

TECHNICAL FIELD

This disclosure relates to wireless communication and in particular to radio resource control (RRC) wide area configuration of a wireless device.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Wireless communication systems according to the 3GPP may include the following channels:

A physical downlink control channel, PDCCH;
A physical uplink control channel, PUCCH;
A physical downlink shared channel, PDSCH;
A physical uplink shared channel, PUSCH;
A physical broadcast channel, PBCH; and
A physical random access channel, PRACH.

In a conditional handover feature standardized in the 3GPP Technical Release 16 (3GPP Rel-16), a WD, which may be a mobile terminal, receives a handover command and stores it without applying the handover command right away as it would have been done in a legacy handover. The handover command may be in a RRCReconfiguration message prepared by a target cell. Along with the handover command, the WD also receives an associated condition to be monitored. When the condition is fulfilled, the WD applies the previously stored handover command, as if the network would have just sent it, instead of first sending a measurement report (that could fail to be transmitted) and then waiting to receive the command (which may fail to be received).

A decision whether to apply the stored handover command is based on the quality of the serving cell(s) and neighbor cells, somewhat similar to the condition that in previous releases leads the WD to transmit a measurement report when the condition is fulfilled. For example, the network can configure the WD to transmit a measurement report when a quality of a neighbor cell becomes better than the quality of the serving cell plus an offset, as a way to indicate to the network that a handover may be needed.

In conditional handover, a similar condition can be configured, except that instead of transmitting the measurement report, the WD applies the stored message. Sending the handover command when the radio conditions are still favorable reduces the risk of failing to successfully transmit the measurement report and/or receive the handover command. It is also possible to configure two conditions for the WD and associate both to the stored command, i.e., the command is applied only if both conditions are fulfilled. To some extent, an attempt to replicate—in the WD—criteria the network would define for handover based on multiple measurement reports triggered by multiple conditions. An example could be measurement reports for different types of measurement quantities, like cell coverage represented by Reference Signal Received Power (RSRP), and quality represented by Reference Signal Received Quality (RSRQ).

On the network side, the serving network node can prepare one or more target "candidate" cells, since there is uncertainty whether the WD will access a specific target cell. The conditional handover preparation procedure has some similarities with the handover preparation procedure, and the outcome is the creation of a handover command (i.e., an RRCReconfiguration message containing the target's configuration). An exception is that the target node does not expect the WD to access it immediately, and in some cases, not even to access it at all.

In a best-case scenario, the WD will execute the handover in only one of the prepared cells. The network node hosting this cell is expected to inform the source node that the WD successfully performed the handover in the cell of the hosting network node, so that the source node can cancel the resources reserved by the remaining target candidate nodes. Additionally, the time between the handover preparation (and therefore the resource reservation) being unknown, the source node is also able to release the reserved resources before the WD executes the handover.

If multiple cells need to be prepared to further increase robustness, and in the best case scenario the WD accesses one of them, a set of resources would need to be reserved while the WD is monitoring the condition and does not perform the handover. The network therefore needs to carefully select the target candidate and keep the number of target candidate cells to a reasonable amount, especially in a resource constrained scenario such as a high load.

User Plane

Current 3GPP standardization supports two approaches: early data forwarding and late data forwarding. In early data forwarding, data is forwarded during the preparation phase and the main benefit is to enable similar interruption performance as in legacy systems while increasing robustness. In that solution, the complexity increases with the number of target candidates and the time it takes until the handover is actually performed. Late data forwarding is a simpler alternative: data starts to be forwarded by the serving node when the WD accesses the target cell. The benefit is that the serving node only forwards data to a single neighbor node, even if multiple neighbor nodes have been prepared, and forwarding only starts after the WD accesses a target cell, i.e., after the condition is fulfilled.

Radio Link Failure (RLF)

Another benefit of conditional handover is that the WD has handover commands stored for multiple cells, which reduces interruption time even if a failure occurs. In the default case (without conditional handover), while the WD is monitoring the conditions, a failure may be detected. In 3GPP Rel-15, the WD would perform cell selection by selecting a neighboring cell to connect to, without the help of the network, and continue with a re-establishment procedure. However, with the introduction of conditional handover, when the same type of failure is detected (for example, a radio link failure (RLF) or handover failure), the terminal can prioritize a cell for which it has a stored handover command and, instead of performing re-establishment, it performs a conditional handover, which reduces the interruption time and reduces over the air signaling.

More

The framework for conditional handover is mainly specified in the Radio Resource Control (RRC) specifications (3GPP Technical Standard (TS) 38.331) and in Xn interface specifications (3GPP TS 38.423) and is made generic so it can be further enhanced for other types of conditional reconfigurations. For example, a conditional primary secondary cell group cell (PSCell) change in case of dual-connectivity is also supported in 3GPP Rel-16, borrowing most of the functionalities defined for conditional handover. A summarized version can be found in 3GPP Technical Standard (TS) 38.300.

Conditional handover for 5G NR is currently under development. Considerations by the 3GPP also include:

- Conditional PScell addition (to be standardized in 3GPP Rel-17, as part of multi-radio access network dual connectivity (MR-DC) enhancements);
- Suspension of conditional handover configurations so that an RRC_INACTIVE WD can resume these configurations when transitioning to RRC_CONNECTED. In 3GPP Rel-16, the WD deletes the conditional handover configurations when entering RRC_INACTIVE or RRC_IDLE mode; the possibility to configure conditional handover during a resume procedure, so the network does not need to use an additional round trip time to configure conditional handover for a WD entering RRC_CONNECTED;
- Transmission of measurements from the WD to the network when conditional handover is being executed, so the network can efficiently setup carrier aggregation and/or dual connectivity.

Conditional Handover details (from 3GPP TS 38.300: 9.2.3.4):

This text is mostly an excerpt from 38.300:9.2.3.4 but in some cases simplified:

"A Conditional Handover (CHO) is defined as a handover that is executed by the WD when one or more handover execution conditions are met. The WD starts evaluating the execution condition(s) upon receiving the CHO configuration, and stops evaluating the execution condition(s) once a handover is executed (legacy handover or conditional handover execution)."

The following principles apply to CHO:

- The CHO configuration contains the configuration of CHO candidate cell(s) generated by the candidate gNB (s) and execution condition(s) generated by the source gNB;
- An execution condition may consist of one or two trigger condition(s). For example, RSRP and RSRQ, RSRP and signal to interference plus noise ratio (SINR), etc., and can be configured simultaneously for the evaluation of CHO execution conditions of a single candidate cell;
- The WD executes a normal HO procedure if it receives a HO command from the network node, regardless of the CHO configuration. Thus, the network can override the CHO configuration at any time;
- While executing CHO, i.e., from the time when the WD starts synchronization with the target cell, the WD does not monitor the source cell.

CHO is not supported for NG-C based handover in the above release of the 3GPP specification.

C-Plane Handling

As in intra-NR radio access network (RAN) handover, in intra-NR RAN CHO, the preparation and execution phase of the conditional handover procedure is performed without involvement of the 5G core node; i.e., preparation messages are directly exchanged between gNBs rather than between base stations via a core node. The release of the resources at the source gNB during the conditional handover completion phase is triggered by the target gNB. FIG. 1, depicts the basic conditional handover scenario where neither the access and mobility management function (AMF) nor the user plane function (UPF) changes. The steps are summarized as follows:

0/1. Same as step 0, 1 in FIG. 9.2.3.2.1-1 of section 9.2.3.2.1 of 3GPP TS 38.300;

2. The source gNB decides to use CHO;
3. The source gNB requests CHO to one or more candidate gNBs. A CHO request message is sent for each candidate cell;
4. Same as step 4 in FIG. 9.2.3.2.1-1 of section 9.2.3.2.1 of 3GPP TS 38.300;
5. The candidate gNB(s) sends the CHO response including configuration of CHO candidate cell(s) to the source gNB. The response message is also sent for each candidate cell;
6. The source gNB sends an RRCReconfiguration message to the WD, containing the configuration of CHO candidate cell(s) and CHO execution condition(s);

NOTE 1: CHO configuration of candidate cells can be followed by other reconfigurations from the source gNB;

7 The WD sends an RRCReconfigurationComplete message to the source gNB;

7a. If early data forwarding is applied, the source gNB sends the EARLY STATUS TRANSFER message;

8. The WD maintains connection with the source gNB after receiving the CHO configuration, and starts evaluating the CHO execution conditions for the candidate cell(s). If at least one CHO candidate cell satisfies the corresponding CHO execution condition, the WD detaches from the source gNB, applies the stored corresponding configuration for that selected candidate cell, synchronizes to that candidate cell and completes the RRC handover procedure by sending an RRCReconfigurationComplete message to the target gNB. The WD releases stored CHO configurations after successful completion of the RRC handover procedure;

8a/b. The target gNB sends the HANDOVER SUCCESS message to the source gNB to inform the source gNB that the WD has successfully accessed the target cell. In return, the source gNB sends the SN STATUS TRANSFER message; NOTE 2: Late data forwarding may be initiated as soon as the source gNB receives the HANDOVER SUCCESS message;

8c. The source gNB sends the HANDOVER CANCEL message toward the other signaling connections or other potential target gNBs, if any, to cancel CHO for the WD.

A concept similar to the CHO concept has been proposed. However, in this proposal, the WD's stored cell configuration is only the so called secondary primary cell information element (SpCell IE), not the full RRC reconfiguration. Also different is that the new SpCell configuration is activated by the new target cell with a medium access control (MAC) control element (CE) transmission to support faster handover (since RRC transmission is slower). One disadvantage with this solution is that it is does not define the area for which cells are to be included in the SpCell. Another disadvantage is that it requires inter-node signaling between the cells for each WD that is configured with more than one SpCell (like the conditional HO described above). Yet another disadvantage is that the solution is only valid for handover and not also for setup from IDLE. From 3GPP TS 38.331:

"CondReconfigToAddModList information element in 3GPP TS 38.331:

The IE CondReconfigToAddModList is a list of conditional reconfigurations to add or modify, with for each entry the condReconfigId and the associated condExecutionCond and condRRCReconfig. 3GPP TS 38.331 V16.1.0 (2020-07)

```
-- ASN1START
-- TAG-CONDRECONFIGTOADDMODLIST-START
CondReconfigToAddModList-r16 ::= SEQUENCE (SIZE (1..
maxNrofCondCells-r16)) OF CondReconfigToAddMod-r16
CondReconfigToAddMod-r16 ::= SEQUENCE {
condReconfigId-r16,
condExecutionCond-r16 SEQUENCE (SIZE (1..2)) OF MeasId
OPTIONAL, -
- Cond condReconfigAdd
condRRCReconfig-r16 OCTET STRING (CONTAINING
RRCReconfiguration) OPTIONAL, -- Cond condReconfigAdd
...
}"
```

The following definitions are also provided.

"condExecutionCond: The execution condition that needs to be fulfilled in order to trigger the execution of a conditional reconfiguration. When configuring two triggering events (MeasId's) for a candidate cell, the network ensures that both refer to the same measObject.

condRRCReconfig: The RRCReconfiguration message to be applied when the condition(s) are fulfilled. The RRCReconfiguration message contained in condRRCReconfig cannot contain the field conditionalReconfiguration."

RRC Reconfiguration

The RRCReconfiguration contains several information elements (IEs), set forth as follows:

```
the RRCReconfiguration for EN-DC:
"RRCReconfiguration-IEs ::= SEQUENCE
  radioBearerConfig        OPTIONAL, -- Need M
  secondaryCellGroup   OCTET STRING (CONTAINING
CellGroupConfig) OPTIONAL, -- Need M
  measConfigMeasConfig   OPTIONAL, -- Need M
  lateNonCriticalExtension   OCTET STRING   OPTIONAL,
  nonCriticalExtension   SEQUENCE { } OPTIONAL"
```

The radioBearerConfig in turn contains the configuration for signal radio bearers (SRBs), data radio bearers (DRBs) and security. The security contains algorithms for the WD. The SRB and DRB configurations are mostly related to the upper layer such as packet data convergence protocol (PDCP) and radio bearer (RB) identity. Note that this radioBearerConfig information element (IE) is also used when the WD is performing setup, i.e., radioBearerConfig is part of the radio resource control (RRC) Setup (but then only for SRB1).

The secondaryCellGroup is the NR configuration in evolved network dual connectivity (EN-DC) (and thus the name "secondary" here since it is the NR cell by default in EN-DC). Note that the structure is similar for the NR stand-alone which is not shown here for simplicity. The measConfigMeasConfig IE is NOT described here. The secondaryCellGroup contains the IE CellGroupConfig. See below the ASN.1 code definition. These configurations are for radio link control (RLC), medium access control (MAC) and physical configurations. The CellGroupConfig can be configured for both primary cell group and/or secondary cell group. Also, this IE, CellGroupConfig is used at RRC Setup but then only for configuring SRB1.

```
CellGroupConfig ::= SEQUENCE {
  cellGroupId,
 rlc-BearerToAddModList            SEQUENCE (SIZE(1..maxLC-ID)) OF RLC-
Bearer-Config   OPTIONAL.
  rlc-BearerToReleaseList          SEQUENCE (SIZE(1..maxLC-ID)) OF
LogicalChannelIdentity   OPTIONAL,
  mac-CellGroupConfig              MAC-CellGroupConfig          OPTIONAL,
  physicalCellGroupConfig          PhysicalCellGroupConfig      OPTIONAL,
  spCellConfig               SpCellConfig     OPTIONAL,
  sCellToAddModList                SEQUENCE (SIZE (1..maxNrofSCells)) OF
SCellConfig   OPTIONAL,
  sCellToReleaseList             SEQUENCE (SIZE (1..maxNrofSCells)) OF
SCellIndex   OPTIONAL,
 }
```

The CellGroupConfig also contains the spCellConfig IE. This has a special purpose when the WD perfoms a handover in case the Reconfiguration WithSync is present. The ReconfigurationWithSync is an IE used to configure cell specific parameters of a WD's serving cell.

```
SpCellConfig ::=            SEQUENCE {
  servCellIndex              ServCellIndex   OPTIONAL,   -- Cond SCG
  reconfigurationWithSync        ReconfigurationWithSync     OPTIONAL,
  rlf-TimersAndConstants         etupRelease { RLF-TimersAndConstants }
OPTIONAL,   -- Need M
  rlmInSyncOutOfSyncThreshold   INTEGER (0..1)
OPTIONAL,   -- Need M
  spCellConfigDedicated          ServingCellConfig      OPTIONAL,
-- Need M
  ...
 }
```

The spCellConfig in turn points to several IEs with a structure such as follows:

spCellConfig;
servCellIndex;
reconfiguration WithSync;
  spCellConfigCommon (PhysCellId);
  newUE-Identity (RNTI for RACH for accessing the PhysCellId);
  t304;
  rach-ConfigDedicated;
  smtc;
rlf-TimersAndConstants;
rlmInSyncOutOfSyncThresh;
spCellConfigDedicated.

The Reconfiguration WithSync IE contains the new cell's radio network temporary identifier (RNTI) value for the WD as well as the dedicated random access channel (RACH) configuration. The ReconfigurationWithSync message also contains the ServingCellConfigCommon IE described below.

```
ReconfigurationWithSync ::=                     SEQUENCE {
    spCellConfigCommon                          ServingCellConfigCommon
OPTIONAL,           -- Need M
    newUE-Identity                              RNTI-Value,
    t304                        ENUMERATED {ms50, ms100, ms150, ms200,
ms500, ms1000
                                                , ms2000, ms10000},
      rach-ConfigDedicated                       CHOICE {
                    uplink                     RACH-ConfigDedicated,
                    supplementary Uplink          RACH-ConfigDedicated
    }                          OPTIONAL,   -- Need N
  }
```

The SpCellConfig IE also contains a ServingCellConfig IE field. It is used to configure the WD with a serving cell. This is mostly WD-specific but partly also cell-specific, for example, the bandwidth parts.

```
ServingCellConfig ::=          SEQUENCE {
    tdd-UL-DL-ConfigurationDedicated   TDD-UL-DL-ConfigDedicated
OPTIONAL,-- Cond TDD
    initialDownlinkBWP                 BWP-DownlinkDedicated   OPTIONAL,   --
Cond ServCellAdd
    downlinkBWP-ToReleaseList                SEQUENCE (SIZE
(1..maxNrofBWPs)) OF BWP-Id   OPTIONAL,
    downlinkBWP-ToAddModList              SEQUENCE (SIZE
(1..maxNrofBWPs)) OF BWP-Downlink OPTIONAL
    firstActiveDownlinkBWP-Id            BWP-Id   OPTIONAL,   -- Need R
    bwp-InactivityTimer              ENUMERATED {ms2, ms3, ms4, ms5, ms6,
ms8, ms10, ms20,
                                   ms30, ms40,ms50, ms60, ms80, ms100, ms200,
                                   ms300, ms500, ms750, ms1280, ms1920, ms2560,
                                   spare10, spare9, spare8, spare7, spare6,
                                   spare5, spare4, spare3, spare2, spare1 }
OPTIONAL,
    defaultDownlinkBWP-Id             BWP-Id   OPTIONAL,   -- Need M
    uplinkConfig                  UplinkConfig   OPTIONAL, -- Cond ServCellAdd-
UL
    supplementaryUplink               UplinkConfig   OPTIONAL, -- Cond
ServCellAdd-SUL
    pdsch-ServingCellConfig           SetupRelease { PDSCH-ServingCellConfig }
OPTIONAL, -- Need M
    csi-MeasConfig                 SetupRelease { CSI-MeasConfig } OPTIONAL, -
- Need M
    carrierSwitching               SetupRelease { SRS-CarrierSwitching}
OPTIONAL,   -- Need M
    sCellDeactivation Timer          ENUMERATED {ms20, ms40, ms80, ms160,
ms200, ms240, ms320,
                                   ms400, ms480, ms520, ms640, ms720, ms840,
                                   ms1280, spare2, spare1} OPTIONAL,-- Cond
ServingCellWithoutPUCCH
    crossCarrierSchedulingConfig          CrossCarrierSchedulingConfig
OPTIONAL,   -- Need M
    tag-Id                      TAG-Id,
    WD-BeamLockFunction               ENUMERATED {enabled}
OPTIONAL,   -- Need R
    pathlossReferenceLinking            ENUMERATED {pCell, sCell} OPTIONAL
-- Cond SCellOnly
```

The ServingCellConfigCommon IE contains parameters which a WD would typically acquire from synchronization signal blocks (SSBs) or system information blocks (SIBs) when accessing the cell from IDLE (to avoid the delay to access the SIBs when the WD performs handover). Note that the ServingCellConfigCommon IE contains the physical cell ID.

```
ServingCellConfigCommon ::= SEQUENCE {
    physCellId                      PhysCellId
    downlinkConfigCommon                    DownlinkConfigCommon,
    uplinkConfigCommon                  UplinkConfigCommon
    supplementaryUplinkConfig                  UplinkConfigCommon
    n-TimingAdvanceOffset               ENUMERATED { n0, n25600, n39936 }
    ssb-PositionsInBurst            CHOICE {
        shortBitmap                 BIT STRING (SIZE (4)),
        mediumBitmap                    BIT STRING (SIZE (8)),
        longBitmap                  BIT STRING (SIZE (64))
    } OPTIONAL, -- Need R,
    ssb-periodicityServingCell                 ENUMERATED { ms5, ms10, ms20, ms40,
ms80, ms160,
                                    spare2, spare1 }OPTIONAL,   -- Need S
    dmrs-TypeA-Position                 ENUMERATED {pos2, pos3 },
    lte-CRS-ToMatchAround                   SetupRelease { RateMatchPatternLTE-
CRS } OPTIONAL,
    rateMatchPatternToAddModList            SEQUENCE (SIZE
(1..maxNrofRateMatchPatterns)) OF
                                RateMatchPattern
    rateMatchPatternToReleaseList           SEQUENCE (SIZE
(1..maxNrofRateMatchPatterns)) OF
                                RateMatchPatternId
    ssbsubcarrierSpacing                SubcarrierSpacing
```

As mobile systems employ higher and higher frequencies, the cell range will probably decrease due to higher propagation loss, lower power amplifier (PA) efficiency, extra attenuation due to rain, etc. This can be mitigated to some extent by techniques such as beamforming, but cell coverage is expected to decrease. This means that the WDs will change cells more often.

Another scenario where the WD may change the cell very often is when satellites are employed to establish communication links as shown in FIG. 2. Since the satellites are moving quite fast, the cell may change very often. For low earth orbit (LEO) satellites with a moving spot beam with a 50 km radius, the spot beam from the satellite at 600 km covers the WD for about 15 seconds.

Also, networks using only very high frequencies (i.e., "stand-alone") may experience spotty coverage, similar to today's Wi-Fi coverage. This means that the WD will more frequently experience coverage loss, i.e., radio link failure (RLF), as shown in FIG. 3. This may still work as long as the users can move into coverage and reestablish the connection quickly. However, this is currently an undesirable process. Thus, FIG. 3 illustrates that cells using high frequencies may not always have complete coverage.

Therefore, a problem with current procedures for RRC configuration of WDs is that a relatively large message needs to be transmitted every time a WD changes cells. The full configuration of RRC reconfiguration or RRC resume messages requires several MAC packet data units (PDUs) and this causes large overhead and delay during the procedure. Large delay and overhead means longer delays for the WD to transmit and receive data. A similar procedure needs to be performed every time the WD goes from IDLE/INACTIVE to CONNECTED.

Large message sizes can to some extent be mitigated by so called delta signaling, where only the necessary new fields are sent to the WD after each handover instead of the so-called full configuration. See FIG. 4 for an example of resume using delta signaling and see FIG. 5 for an example of setup using delta signaling.

One problem with delta signaling is that implementation of delta signaling is complicated and is therefore seldom used in today's network. Therefore, for each handover, a full configuration is typically used. Another problem with delta signaling is that the number of signaling messages are still the same, so the time saved may be rather small.

Another way to decrease the signaling when the actual reconfiguration takes place is to use conditional handover (CHO). In CHO, the gNB configures the WD beforehand with a set of possible RRCReconfiguration (cell configurations) which the WD can use if the condition is met.

A problem with CHO is that it requires inter-node signaling between the source and target gNBs for each new CHO configuration, and this needs to be done after every cell change (handover). Since the WD releases the stored CHO configurations after a successful completion of an RRC handover procedure (see section 2.1.2.4, step 8 in FIG. 1 from 3GPP TS 38.300), all the CHO configurations must be renewed after every HO.

To summarize, the current reconfiguration that takes place during handover, resume or set up of a WD will require large messages to be transmitted during the procedures which will make the procedures undesirably slow.

SUMMARY

Some embodiments advantageously provide a method and system for radio resource control (RRC) wide area configuration of a wireless device.

When a WD registers or enters a cell in a defined wide area for the first time, the cell in which the WD enters the wide area informs the central network node. The central network node then sends a list of the RRC configurations of all cells belonging to the wide areas to the cell (the RRCWideAreaReconfiguration message) entered by the WD.

The wide area is typically the set of cells covering a large geographical area but can also be a small area such an office with an indoor deployment of a smaller number of cells. It can also be or include an area or areas covered by a satellite system covering certain areas where cell changes are common. More examples of how a wide area may be constructed or defined are provided herein. Generally, a wide area may be defined as an area encompassed or covered by a collection of cells which may or may not be adjacent. A wide area configuration may be defined to include a configuration that includes the collection of cells of the wide area and/or the collection of WDs served by the collection of cells of the wide area.

The RRCWideAreaReconfiguration message contains a list of RRC Information Elements (IEs) per cell needed to construct an RRCReconfiguration (handover), RRCResume or an RRCSetUp (initial setup) to any cell within the wide area, without having to receive a new reconfiguration.

Thus, if a WD is a member of a wide area configuration (which configuration can be configured by a core network node), the WD may receive configuration information elements for each cell of the wide area configuration of which the WD is designated to be a member.

The RRC Information Elements per cell may be different (unique per cell) or may be the same or similar per cell. If the RRC Information Elements are the same or similar for many cells in the wide area, there is a possibility to merge configuration information from several cells into one, with only the unique fields separated, i.e., similar to delta signaling (where a first entered cell's configuration is the base reconfiguration). The RRCWideAreaReconfiguration can be performed in the background after the current cell is configured.

The complete RRCWideAreaReconfiguration contains RRC IEs for all cells within a wide area. These IEs contain information to construct an RRCReconfiguration, RRCResume and/or RRCSetup message to any cell in the wide area. Also, in some embodiments, the IEs of the RRCWideAreaReconfiguration may be limited to IEs that do not require any resource reservation. The RRCWideAreaReconfiguration is sent to a network node serving a cell (a cell network node). In contrast to the RRCWideAreaReconfiguration, the active RRCWideAreaReconfiguration includes IEs for all cells within the active wide area. These IEs contain information to construct an RRCReconfiguration, RRCResume and/or RRCSetup message for any cell in the active wide area. Thus, in the case of the RRCWideAreaReconfiguration, updates are not needed because all resources are configured to the WD. In the case of the active RRCWideAreaReconfiguration, when the WD moves into the wide area, the cells may only need to update the resource configurations. This limits the message exchange over the Uu interface (over the air between the WD and the cell network node). The subset (active wide area) may be the cells surrounding the WD or based on statistics of the WD movement. Thus, a subset of cells of the wide area may be referred to as the active wide area with corresponding active RRCWideAreaReconfiguration. It should be noted that the active wide area configuration may also require reservation of resources in the cells belonging to the active wide area such as C-RNTI, dedicated search spaces, and PUCCH configurations. The size of the active wide area and the number of WDs configured with an active RRCWideAreaReconfiguration may be balanced against the cost of reserving resources.

The WD may then execute a handover or resume or setup to any cell in the wide-area which has its configuration as part of the active RRCWideAreaReconfiguration, with much less signaling. In principle, the WD may employ a random access procedure in the new cell in order to obtain a timing advance (TA) (in msg2/msgB) and send the WD ID to the cell network node in msg3/MsgA. With some embodiments disclosed herein, the WD avoids the large msg4 (reception of setup, resume and reconfiguration) used in conventional handover, resume and set up procedures and can instead transmit data immediately. This is shown in FIG. 11, described in detail below, which includes WD registration, cell registration, cell configuration and WD configuration, steps 1-4, as well as handover to another cell network node, steps 5-11.

In some embodiments, the active RRCWideAreaReconfiguration list may not be deleted after a handover/resume/setup so it can be reused within the active wide-area without any new signaling (as would be the case for CHO after a CHO has been completed). Thus, the WD also keeps the active RRCWideAreaReconfiguration when it goes to IDLE as long as it remains in a cell which has its configuration as part of the active RRCWideAreaReconfiguration. When the WD makes a transition from IDLE to CONNECTED it can reuse the RRCWideAreaReconfiguration for the RRC Setup and use less signaling and overhead to perform faster handover, resume and setup.

The WDs in the active wide-area can perform faster handover, resume and setup procedures since several messages can be completely omitted. These omitted messages can be preconfigured. Another advantage of some embodiments is faster resume from Inactive and setup from IDLE states. The faster resume time arises because no reconfiguration needs to be sent when the resume procedures are carried out. This means less signaling between the WD and cell network nodes as well as less inter-node signaling, and faster and more reliable cell changes.

For CHO, the configurations for cells in an area need to be resent every time the WD makes a handover or every time the WD goes to idle. Also, in CHO, the source cell needs to communicate with all potential target cells, while in some embodiments presented herein, only a single message to one node may be relied upon for handover. Thus, some embodiments are especially beneficial for an integrated access and backhaul (IAB) scenario where the backhaul is a scarce wireless resource.

According to one aspect, a method in a central network node in communication with a plurality of wireless devices, WDs, via one or more cell network nodes is provided. The method includes configuring a set of cells to be included in a wide area configuration for a WD. The method also includes sending a wide area cell configuration signal to the WD, the wide area cell configuration signal including configurations for each cell in a predefined wide area, the predefined wide area being a collection of cells, the configurations including setup, resume and hand over configurations and resource allocations for an active wide area including a subset of cells of the collection of cells of the predefined wide area.

According to this aspect, in some embodiments, the wide area cell configuration signal excludes resource reservations for cells in the predefined wide area that are not in the active wide area. In some embodiments, the subset of cells include neighboring cells, a neighboring cell being a cell which may be entered by the WD directly from a current cell without the WD entering another cell. In some embodiments, a plurality of cells in the set of cells have a same resource allocation. In some embodiments, a configuration for a cell is determined by a respective cell network node serving the cell and received by the central network node from the respective cell network node, for at least one cell in the set of cells. In some embodiments, configuring the set of cells includes determining whether to include a particular cell in the set of cells based at least in part on whether the particular cell is a neighboring cell of a current cell of the WD, a neighboring cell being a cell which may be entered by the WD directly from a current cell without the WD entering another cell. In some embodiments, configuring the set of cells includes determining whether to include a particular cell in the set of cells based at least in part on whether the particular cell is a cell where the WD is predicted to be. In some embodiments, a number of cells included in the set of cells depends at least in part a number of WDs having predictable movement to a limited set of locations. In some embodiments, a number of cells included in the set of cells depends at least in part on a number of WDs being served by cell network nodes serving the set of cells. In some embodiments, a number of cells included in the set of cells depends at least in part on a capability of the WD. In some embodiments, the method also includes comprising sending to at least one cell network node an indication to release resources allocated to the WD for an area served by a set of cell network nodes serving the set of cells.

According to another aspect, a central network node in communication with a plurality of wireless devices, WDs, via one or more cell network nodes, the central network node including processing circuitry configured to configure a set of cells to be included in a wide area configuration for a WD; and send a wide area cell configuration signal to the WD, the wide area cell configuration signal including configurations for each cell in a predefined wide area, the predefined wide area being a collection of cells, the configurations including setup, resume and hand over configurations and resource allocations for an active wide area including a subset of cells of the collection of cells of the predefined wide area.

According to this aspect, in some embodiments, the wide area cell configuration signal excludes resource reservations for cells in the predefined wide area that are not in the active wide area. In some embodiments, the subset of cells include neighboring cells, a neighboring cell being a cell which may be entered by the WD directly from a current cell without the WD entering another cell. In some embodiments, a plurality of cells in the set of cells have a same resource allocation. In some embodiments, a configuration for a cell is determined by a respective cell network node serving the cell and received by the central network node from the respective cell network node, for at least one cell in the set of cells. In some embodiments, configuring the set of cells includes determining whether to include a particular cell in the set of cells based at least in part on whether the particular cell is a neighboring cell of a current cell of the WD, a neighboring cell being a cell which may be entered by the WD directly from a current cell without the WD entering another cell. In some embodiments, configuring the set of cells includes determining whether to include a particular cell in the set of cells based at least in part on whether the particular cell is a cell where the WD is predicted to be. In some embodiments, a number of cells included in the set of cells depends at least in part a number of WDs having predictable movement to a limited set of locations. In some embodiments, a number of cells included in the set of cells depends at least in part on a number of WDs being served by cell network nodes serving the set of cells. In some embodiments, a number of cells included in the set of cells depends at least in part on a capability of the WD. In some embodiments, the processing circuitry is further configured to send to at least one cell network node an indication to release resources allocated to the WD for an area served by a set of cell network nodes serving the set of cells.

According to yet another aspect, a method in a cell network node, in communication with a central network node and a wireless device, WD, is provided. The method includes: sending wide area cell configuration information to the central network node, the wide area cell configuration information including cell configurations for each cell in a predefined wide area. The method also includes receiving an indication whether the WD is in a wide area cell configuration configured by the central network node. The method also includes, when the WD is in the predefined wide area, configuring the WD with wide area cell configuration information for each cell in the predefined wide area, the wide area cell configuration information including setup, resume and hand over configurations and resource allocations for an active wide area including a subset of cells of the predefined wide area.

According to this aspect, in some embodiments, the subset of cells include cells neighboring a current cell of the WD, a neighboring cell being a cell which may be entered by the WD directly from the current cell without the WD entering another cell. In some embodiments, the method also includes notifying the central network node when the WD enters a cell of the predefined wide area. In some embodiments, the method also includes determining a reduced message exchange for establishing and/or resuming communication with the WD when the WD enters or is within a cell of the predefined wide area. In some embodiments, the method also includes notifying the central network node when the WD leaves a cell of the predefined wide area.

According to another aspect, a cell network node, in communication with a central network node and a wireless device, WD, is provided. The cell network node includes a radio interface configured to: send wide area cell configuration information to the central network node, the wide area cell configuration information including cell configurations for each cell in a predefined wide area; and receive an indication whether the WD is in a wide area cell configuration configured by the central network node. The method also includes processing circuitry configured to, when the WD is in the predefined wide area, configure the WD with wide area cell configuration information for each cell in the predefined wide area, the wide area cell configuration information including setup, resume and hand over configurations and resource allocations for an active wide area including a subset of cells of the predefined wide area.

According to this aspect, in some embodiments, the subset of cells include cells neighboring a current cell of the WD, a neighboring cell being a cell which may be entered by the WD directly from the current cell without the WD entering another cell. In some embodiments, the radio interface is further configured to notify the central network node when the WD enters a cell of the predefined wide area. In some embodiments, the processing circuitry is further configured to determine a reduced message exchange for establishing and/or resuming communication with the WD when the WD enters or is within a cell of the predefined wide area. In some embodiments, the radio interface is further configured to notify the central network node when the WD leaves a cell of the predefined wide area.

According to yet another aspect, a method in a wireless device, WD, configured to communicate with a cell network node, the cell network node being in communication with a central network node, is provided. The method includes receiving a cell configuration signal from the cell network node, the cell configuration signal including cell configuration information for each of a plurality of cells in a predefined wide area configured by the central network node;

and storing the cell configuration information for use to establish or resume communication with the cell network node or another cell network node serving a cell of the plurality of cells in the predefined wide area as long as the WD is connected to at least one of the cells in the predefined wide area.

According to this aspect, the method includes sending a request to obtain the cell configuration signal, wherein the cell configuration signal from the cell network node is responsive to the request. In some embodiments, the method also includes using a reduced message set to establish or resume communication with a cell network node serving a cell of the predefined wide area.

According another aspect, a wireless device, WD, configured to communicate with a cell network node, the cell network node being in communication with a central network node, is provided. The WD includes: a radio interface configured to receive a cell configuration signal from the cell network node, the cell configuration signal including cell configuration information for each of a plurality of cells in a predefined wide area configured by the central network node; and processing circuitry configured to store storing the cell configuration information for use to establish or resume communication with the cell network node or another cell network node serving a cell of the plurality of cells in the predefined wide area as long as the WD is connected to at least one of the cells in the predefined wide area.

According to this aspect, the radio interface is further configured to send a request to obtain the cell configuration signal, wherein the cell configuration signal from the cell network node is responsive to the request. In some embodiments, the processing circuitry is further configured to use a reduced message set to establish or resume communication with a cell network node serving a cell of the predefined wide area.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
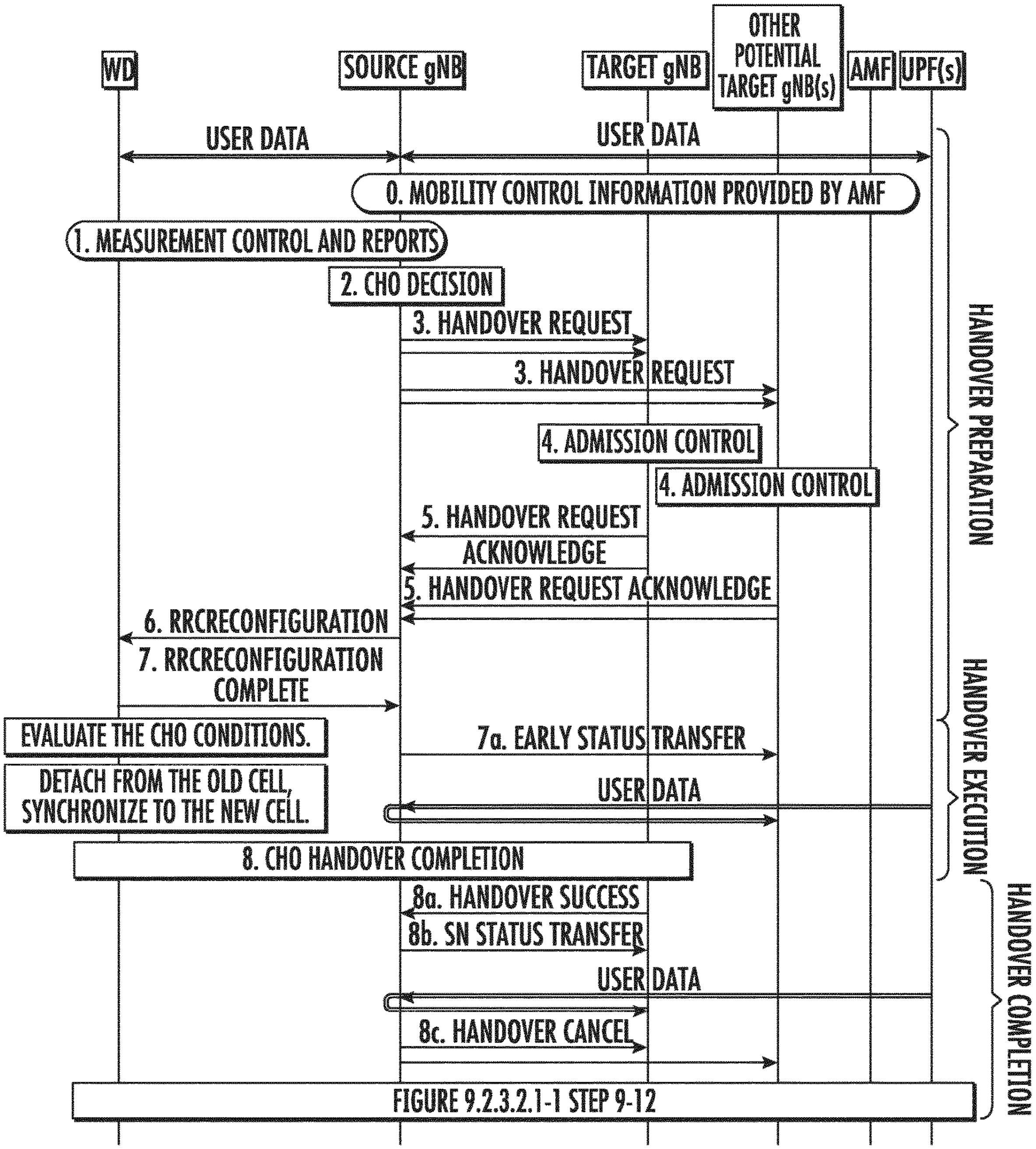
FIG. 1 depicts a basic conditional hand over scenario.
Figure 2:
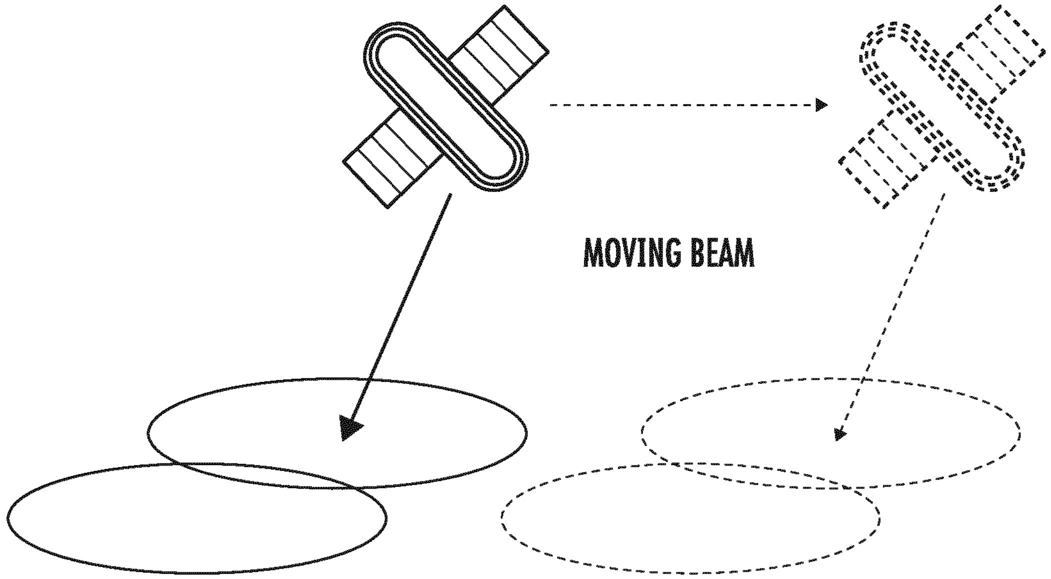
FIG. 2 depicts satellite communication links.
Figure 3:
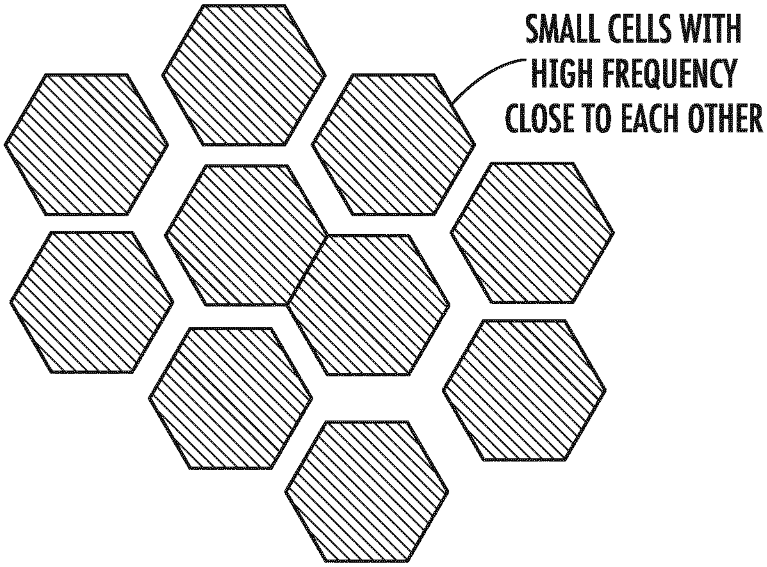
FIG. 3 depicts small cells with high frequency being close to each other.
Figure 4:
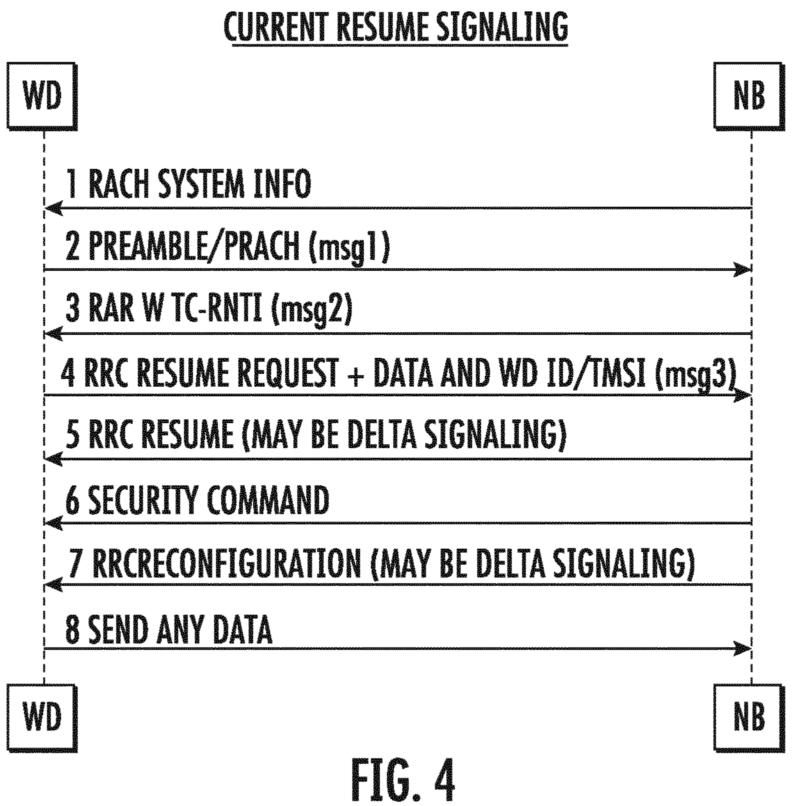
FIG. 4 illustrates a known resume signaling exchange.
Figure 5:
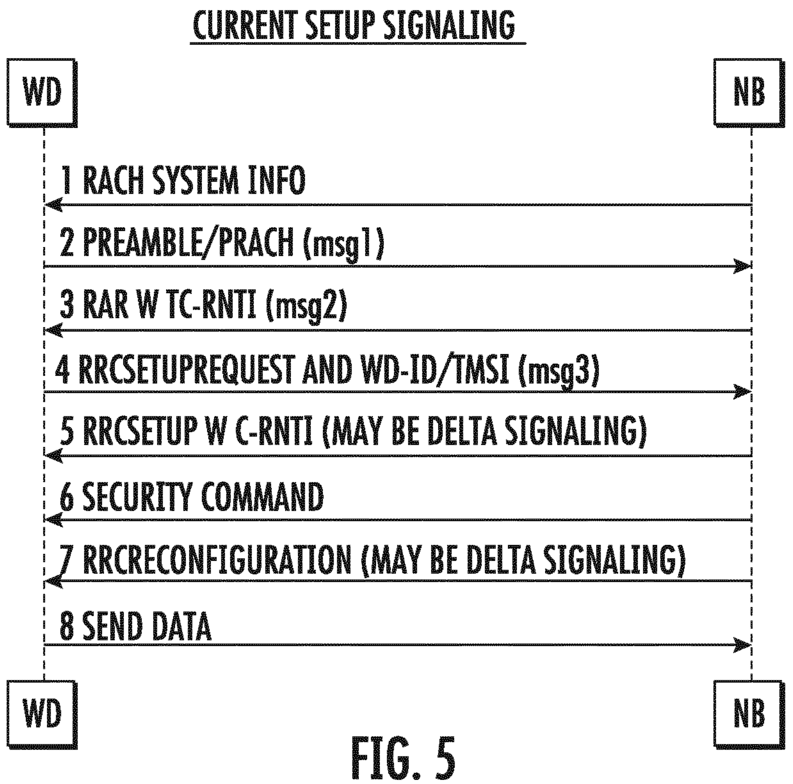
FIG. 5 illustrates a known setup signaling exchange.

Before describing in detail exemplary embodiments, it is noted that the embodiments reside primarily in combinations of apparatus components and processing steps related to radio resource control (RRC) wide area configuration of a wireless device. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/ multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, methods, network nodes and wireless devices for radio resource control (RRC) wide area configuration of a wireless device are disclosed.

Figure 6:
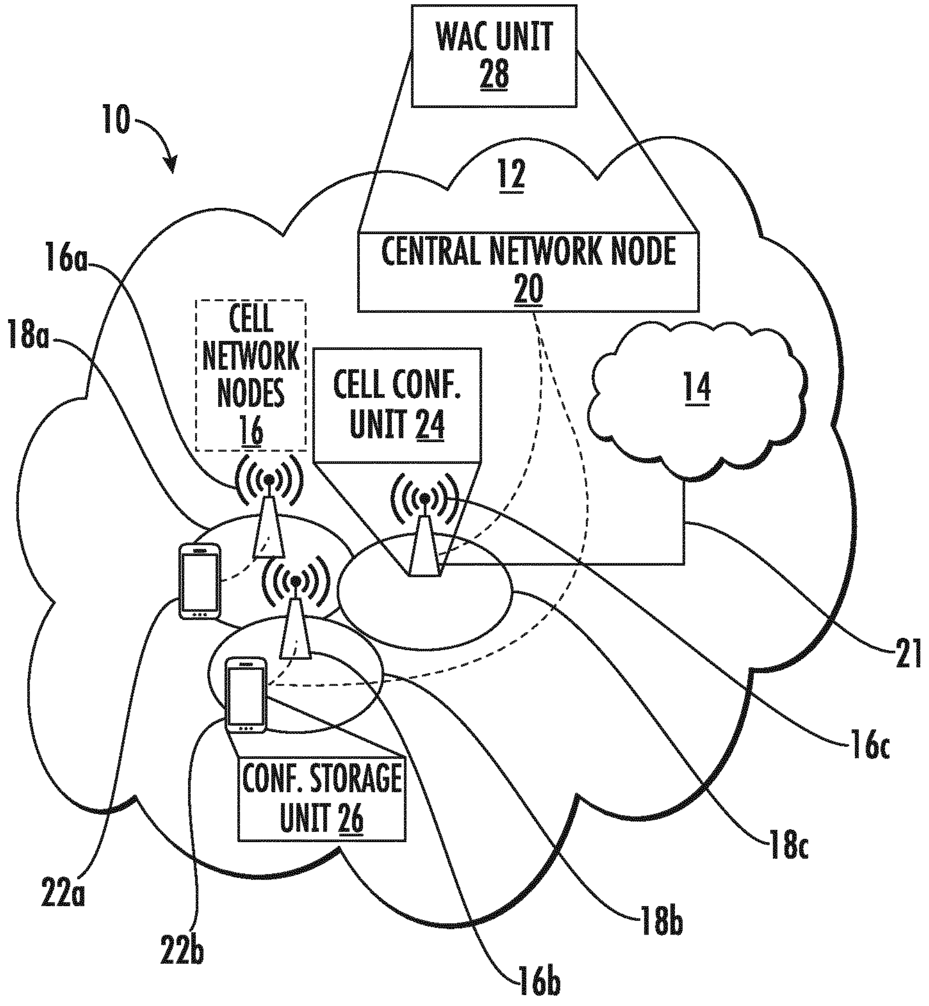
FIG. 6 is a schematic diagram of an example network architecture illustrating a communication system according to principles disclosed herein.

Referring again to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of cell network nodes 16*a*, 16*b*, 16*c* (referred to collectively as cell network nodes 16), such as NBs, eNBs, gNBs or other types of wireless access points, each defining a corresponding coverage area 18*a*, 18*b*, 18*c* (referred to collectively as coverage areas 18). A central network node 20 is in wireless or wireline communication with the plurality of cell network nodes 16. A function of the central network node 20 is to configure and predefine a plurality of cells to be in a wide area configuration. Each cell network node 16*a*, 16*b*, 16*c* is connectable to the core network 14 over a wired or wireless connection 21. A first wireless device (WD) 22*a* located in coverage area 18*a* is configured to wirelessly connect to, or be paged by, the corresponding cell network node 16*a*. A second WD 22*b* in coverage area 18*b* is wirelessly connectable to the corresponding cell network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding cell network node 16. Note that although only two WDs 22 and three cell network nodes 16 are shown for convenience, the communication system may include many more WDs 22 and cell network nodes 16. In some embodiments, the central network node 20 may optionally be in communication with a WD 22. In some embodiments, the central network node 20 may be another cell network node that serves one or more cells or may be a core network node. In some embodiments, the central network node 20 may be in the core network 14.

Also, it is contemplated that a WD 22 can be in simultaneous communication and/or configured to separately communicate with more than one cell network node 16 and more than one type of cell network node 16, and may further communicate with the central network node 20. For example, a WD 22 can have dual connectivity with a cell network node 16 or central network node 20 that supports LTE and the same or a different cell network node 16 or central network node 20 that supports NR. As an example, WD 22 can be in communication with an eNB for LTE/E-UTRAN and a gNB for NR/NG-RAN.

A central network node 20 may be configured to include a wide area configuration unit (WAC) 28 which is configured to configure a set of cells to be included in a wide area configuration for a WD 22. A cell network node 16 is configured to include a cell configuration unit 24 which is configured to, when the WD 22 is in the predefined wide area, configure the WD 22 with wide area cell configuration information for each cell in the predefined wide area, the wide area cell configuration information including setup, resume and hand over configurations and resource allocations for an active wide area including a subset of cells of the predefined wide area.

A wireless device 22 is configured to include a configuration storage unit 26 which is configured to store the cell configuration information to establish or resume communication with the cell network node 16 or another cell network node 16 serving a cell of the plurality of cells in the predefined wide area as long as the WD 22 is connected to at least one of the cells in the predefined wide area.

Example implementations, in accordance with an embodiment, of the WD 22, central network node 20 and cell network node 16 discussed in the preceding paragraphs will now be described with reference to FIG. 7.

The communication system 10 includes a cell network node 16 provided in a communication system 10 and including hardware 29 enabling it to communicate with the WD 22. Hereinafter, functions, hardware and software described with reference to a cell network node 16 may also describe some of the functions, hardware and software found in the central network node 20. The hardware 29 may include a radio interface 30 for setting up and maintaining at least a wireless connection 32 with a WD 22 located in a coverage area 18 served by the cell network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves. Similarly, the central network node 20 may include a radio interface 31 having an array of antennas 35 that perform similar functions as performed by the radio interface 30 and antennas 34.

In the embodiment shown, the hardware 29 of the cell network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Similarly the central network node 20 includes processing circuitry 37 which may include a processor 39 and memory 41 that perform similar functions as performed by the processing circuitry 36, processor 38 and memory 40. The memory 41 may store software executable by the processor 39.

Thus, the cell network node 16 further has software 42 stored internally in, for example, memory 40, or stored in external memory (e.g., database, storage array, network storage device, etc.) accessible by the cell network node 16 via an external connection. The software 42 may be executable by the processing circuitry 36. The processing circuitry 36 may be configured to control any of the methods and/or processes described herein and/or to cause such methods, and/or processes to be performed, e.g., by the cell network node 16. Processor 38 corresponds to one or more processors 38 for performing cell network node functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to cell network node 16. For example, processing circuitry 36 of the cell network node 16 may include cell configuration unit 24 which is configured to, when the WD 22 is in the predefined wide area, configure the WD 22 with wide area cell configuration information for each cell in the predefined wide area, the wide area cell configuration information including setup, resume and hand over configurations and resource allocations for an active wide area including a subset of cells of the predefined wide area. Also, the central network node 20 may include software stored in the memory 41 and executable by the processor 39 to perform the functions of the wide area configuration (WAC) unit 28. These functions include configuring a set of cells to be included in a wide area configuration for a WD 22.

The communication system 10 further includes the WD 22 already referred to. The WD 22 may have hardware 44 that may include a radio interface 46 configured to set up and maintain a wireless connection 32 with a cell network node 16 serving a coverage area 18 in which the WD 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22. For example, the processing circuitry 50 of the wireless device 22 may include a configuration storage unit which is configured to include a configuration storage unit 26 which is configured to store the cell configuration information to establish or resume communication with the cell network node 16 or another cell network node 16 serving a cell of the plurality of cells in the predefined wide area as long as the WD 22 is connected to at least one of the cells in the predefined wide area.

Figure 7:
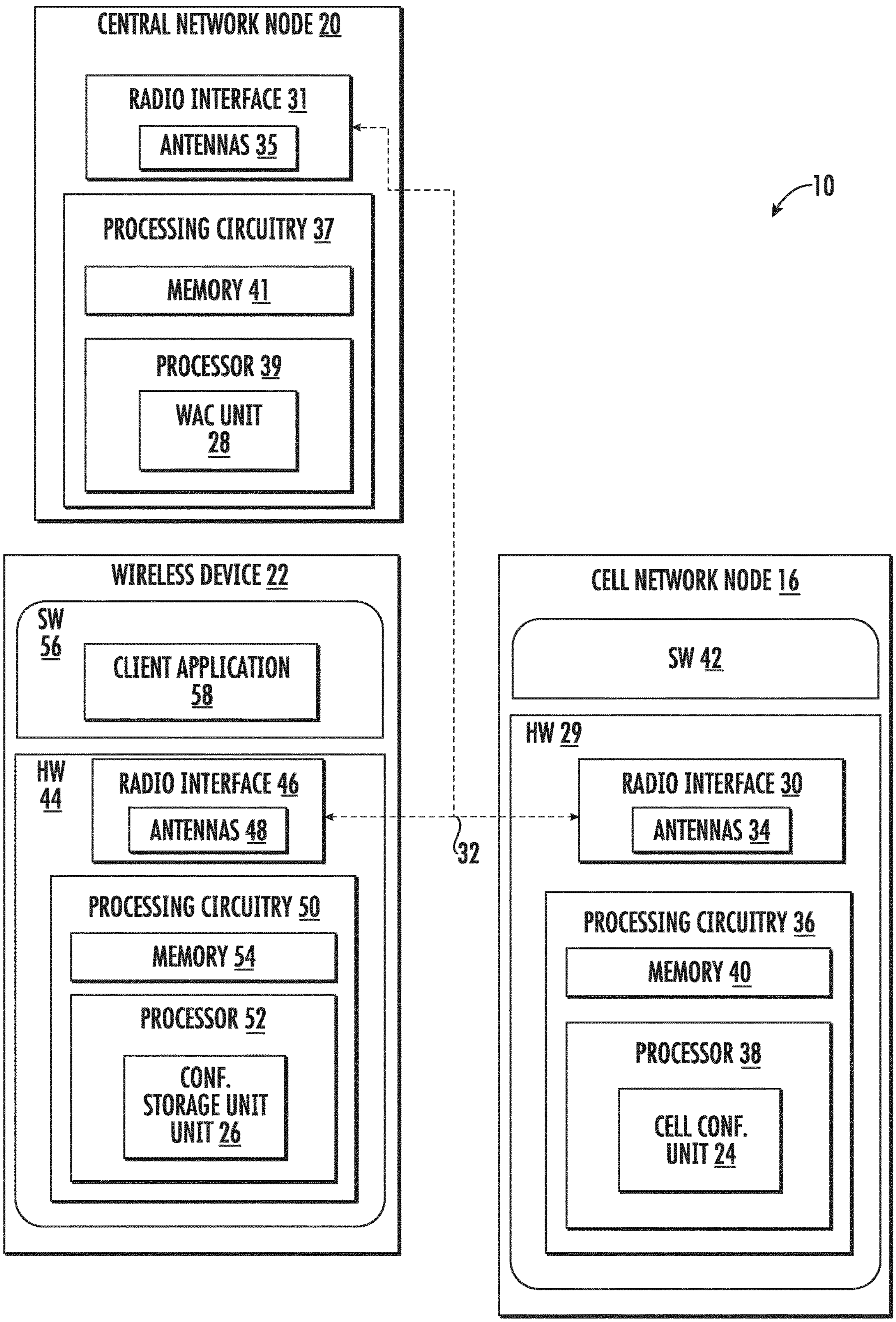
FIG. 7 is a block diagram of a network node in communication with a wireless device over a wireless connection according to some embodiments of the present disclosure.

In some embodiments, the inner workings of the central network node 20, cell network node 16 and WD 22 may be as shown in FIG. 7 and independently, the surrounding network topology may be that of FIG. 6.

The wireless connection 32 between the WD 22 and the cell network node 16 and/or the central network node 20 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 6 and 7 show various "units" such as cell configuration unit 24, configuration storage unit 26 and wide area configuration unit 28 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 8:
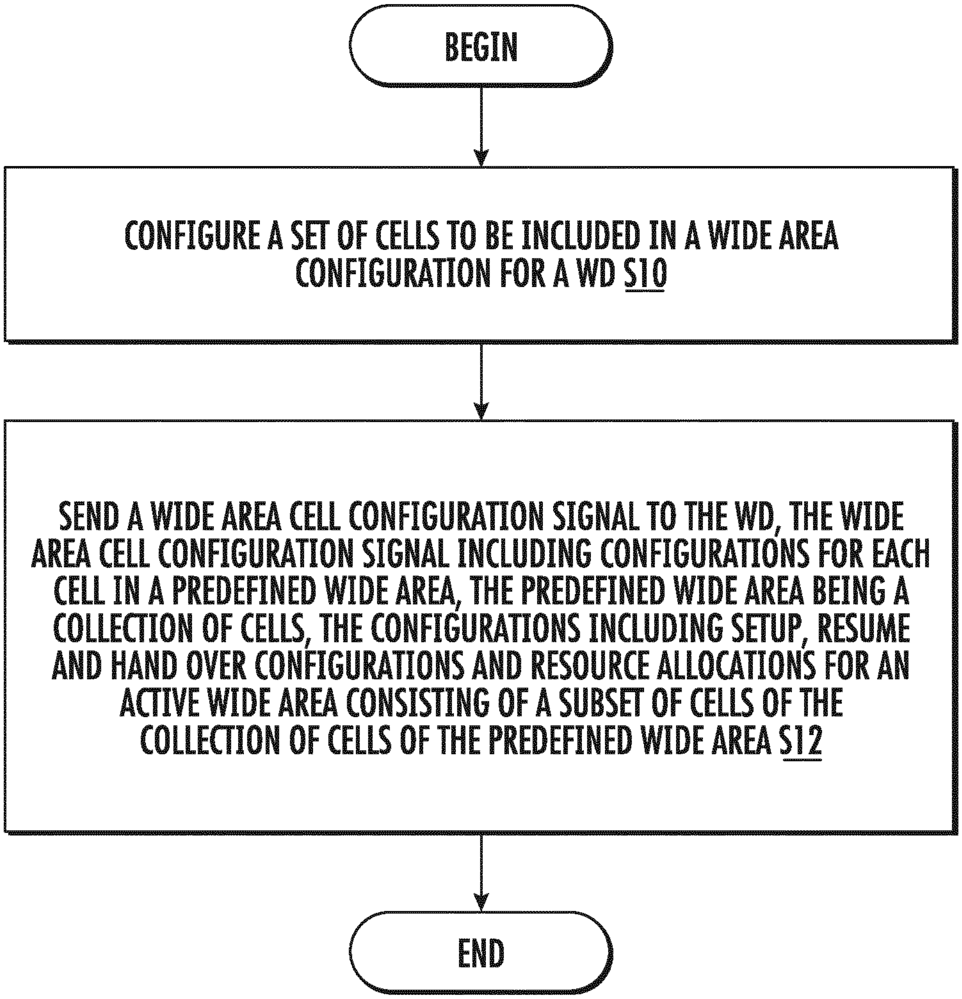
FIG. 8 is a flowchart of an example process in a central network node for configuring a wide area cell configuration according to some embodiments of the present disclosure.

FIG. 8 is a flowchart of an example process in a central network node 20 for radio resource control (RRC) wide area configuration of a wireless device. One or more blocks described herein may be performed by one or more elements of central network node 20 such as by one or more of processing circuitry 37 (including the wide area configuration (WAC) unit 28), processor 39, and/or radio interface 31. Central network node 20 such as via processing circuitry 37 and/or processor 39 and/or radio interface 31 is configured to configure a set of cells to be included in a wide area configuration for a WD 22 (Block S10). The process also includes sending a wide area cell configuration signal to the WD 22, the wide area cell configuration signal including configurations for each cell in a predefined wide area, the predefined wide area being a collection of cells, the configurations including setup, resume and hand over configurations and resource allocations for an active wide area including a subset of cells of the collection of cells of the predefined wide area (Block S12)

Figure 9:
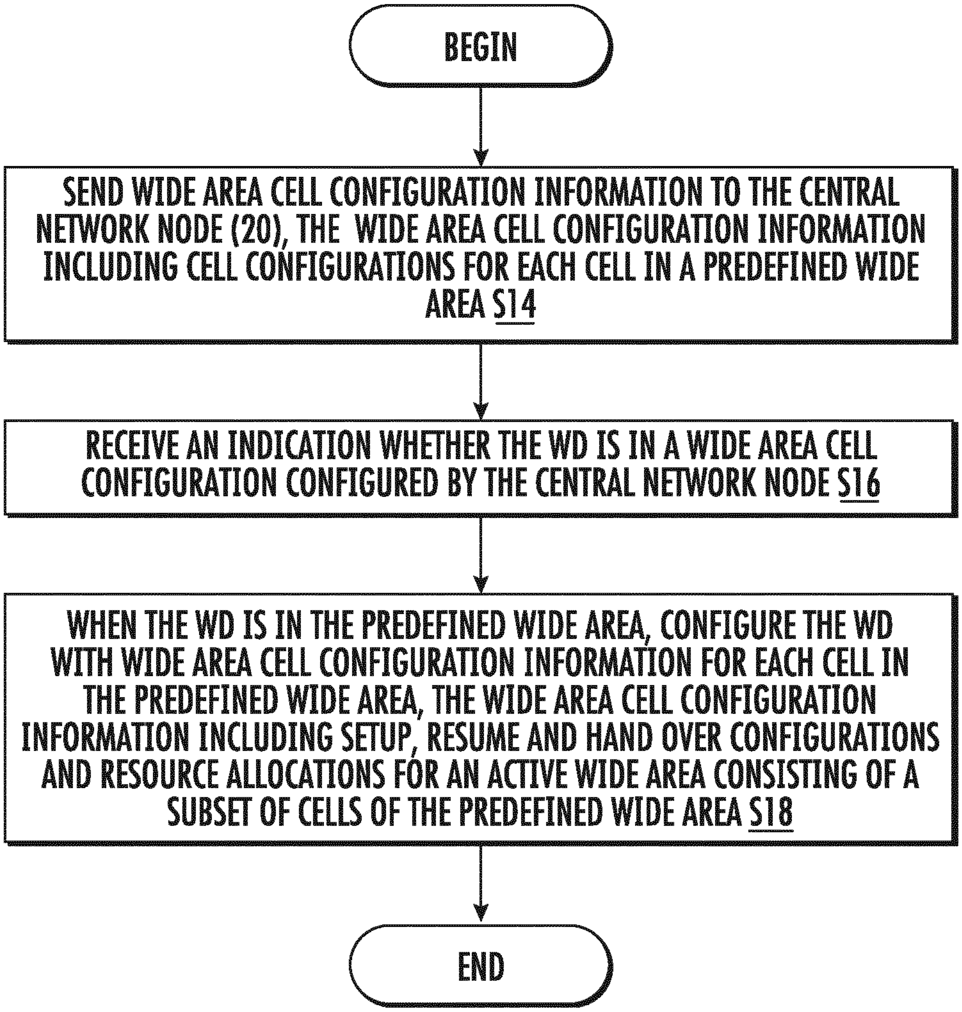
FIG. 9 is a flowchart of an example process in a cell network node for receiving cell configuration for a plurality of cells in a wide area configuration.

FIG. 9 is a flowchart of an example process in a cell network node 16 for radio resource control (RRC) wide area configuration of a wireless device 22. One or more blocks described herein may be performed by one or more elements of the cell network node 16 such as by one or more of processing circuitry 36 (including the cell configuration unit 24), processor 38, and/or radio interface 30. Cell network node 16 such as via processing circuitry 36 and/or processor 38 and/or radio interface 30 is configured to send wide area cell configuration information to the central network node 20, the wide area cell configuration information including cell configurations for each cell in a predefined wide area (Block S14). The process also includes receiving S16 an indication whether the WD 22 is in a wide area cell configuration configured by the central network node 20 (Block S16). The process also includes, when the WD 22 is in the predefined wide area, configuring S18 the WD 22 with wide area cell configuration information for each cell in the predefined wide area, the wide area cell configuration information including setup, resume and hand over configurations and resource allocations for an active wide area including a subset of cells of the predefined wide area (Block S18).

Figure 10:
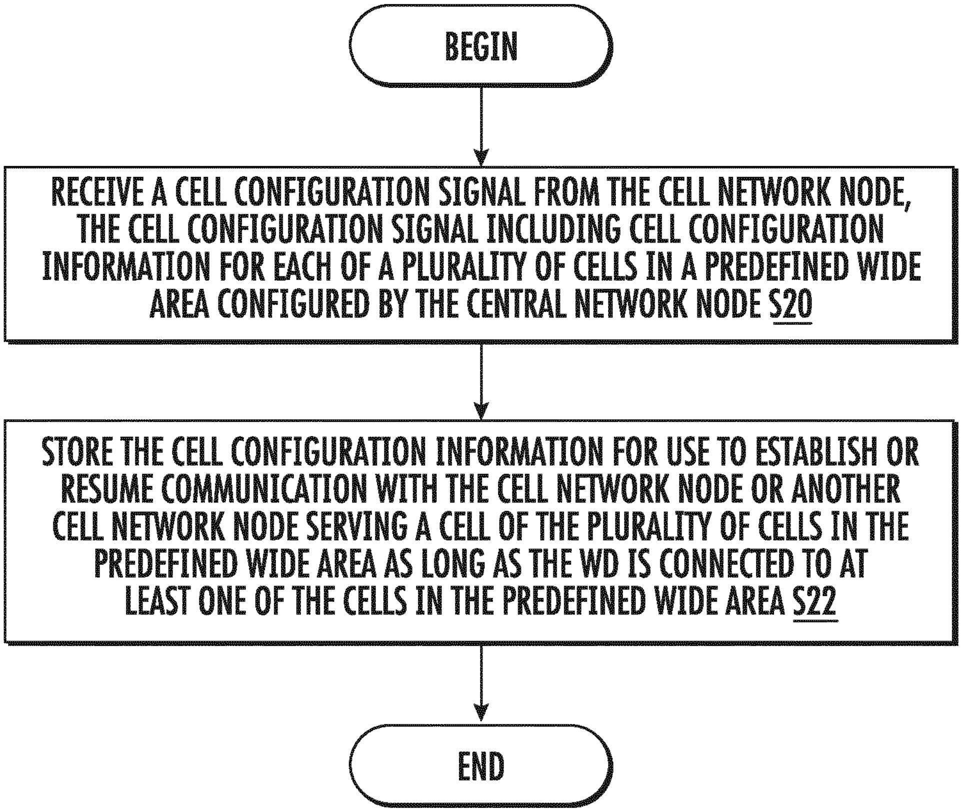
FIG. 10 is a flowchart of an example process in a WD for storing cell configuration information for a plurality of cells.

FIG. 10 is a flowchart of an example process in a wireless device 22 according to some embodiments of the present disclosure. One or more blocks described herein may be performed by one or more elements of wireless device 22 such as by one or more of processing circuitry 50 (including the configuration storage unit 26), processor 52, and/or radio interface 46. Wireless device 22 such as via processing circuitry 50 and/or processor 52 and/or radio interface 46 is configured to receive a cell configuration signal from the cell network node, the cell configuration signal including cell configuration information for each of a plurality of cells in a predefined wide area configured by the central network node 20 (block S20). The process also includes storing the cell configuration information to establish or resume communication with the cell network node 16 or another cell network node 16 serving a cell of the plurality of cells in the predefined wide area as long as the WD 22 is connected to at least one of the cells in the predefined wide area (Block S22).

Having described the general process flow of arrangements of the disclosure and having provided examples of hardware and software arrangements for implementing the processes and functions of the disclosure, the sections below provide details and examples of arrangements for radio resource control (RRC) wide area configuration of a wireless device.

Some definitions used in the description of some embodiments may include:

Wide-area: a set of logically related cells which may cover a large geographical area that may include neighboring cells. A neighboring cell may be defined as a cell that may be entered directly from a current cell of the WD 22 without the WD 22 first entering another cell to maintain communication.

This set might typically be large, e.g. containing hundreds of cells and might typically be fixed. The information regarding the configuration of the cells in the wide area set of cells may not be sent over the Uu interface but only between cell network nodes 16, in some embodiments.

Active wide-area: a subset of cells of the wide-area, which may, in some embodiments, include neighboring cells. This set can be a small set of cells covering an office building, for example, or the cells a WD 22 has visited during the last week or month, for example. The active wide area can be dynamically changed by the central network node 20 when, for example, the WD 22 moves to positions where the WD 22 might by handed over to a cell not belonging to the active wide-area. The information (i.e., configurations of cells belonging to this set) may be sent to the WD 22. Thus, a wide area may include a collection of cells and an active wide area is a subset of the collection of cells and may include some or all of the cells of the collection of cells.

A configuration may be in part cell-specific. Such cell-specific configurations may include RACH configurations, common search spaces, and/or several parameter settings. Other configurations are WD-specific. Such WD-specific configurations may include C-RNTIs, dedicated search spaces and/or PUCCH resources. The WD-specific configurations will typically be reserved in each cell in the active wide area. This will put demands on the number of cells in the active wide area and/or the number of WDs 22 that are configured with an active wide area configuration. Some methods to handle this are described below.

In some embodiments, WDs 22 are configured with an active wide-area cell configuration. When so configured, a WD 22 may register with a wide area upon first entering a cell in the wide area configuration and/or the cell network node 16 recognizes when the WD 22 enters the cell whether the WD 22 is already registered with the wide area. Therefore, referring to FIG. 11, Cell network node A 16 informs the central network node 20 about the new WD 22 entering the wide area, and the central network node replies with all necessary RRC IEs for all cells within the wide area needed to construct a RRCReconfiguration, RRCResume and RRC-Setup message to any cell in the wide area. This message is called the RRCWideAreaConfiguration message (step 3, FIG. 11).

Cell network node A 16 constructs a corresponding active RRCWideAreaConfiguration which contains all necessary RRC IE for all cells within the active wide area needed to construct a RRCReconfiguration, RRCResume and RRC-Setup message to any cell in the active wide-area. Cell network node A 16 then informs the central network node 20 when this is completed (step 5 in FIG. 11).

In some embodiments, the RRCWideAreaConfiguration contains all IEs and fields that do not require any resource reservation, while the active RRCWideAreaConfiguration may have all necessary RRC IE for all cells within the active wide-area needed to construct a RRCReconfiguration, RRCResume and RRCSetup message to any cell in the active wide-area.

The central network node 20 then informs all cell network nodes 16 in the active wide-area for which the WD 22 has been configured. Each cell network node 16 in the active wide-area then reserves resources for the WD 22 to be prepared if it enters a new cell in the wide-area. When the WD 22 enters cell B it can immediately use the active RRCWideAreaReconfiguration for cell B (step 11, FIG. 11).

Figure 11:
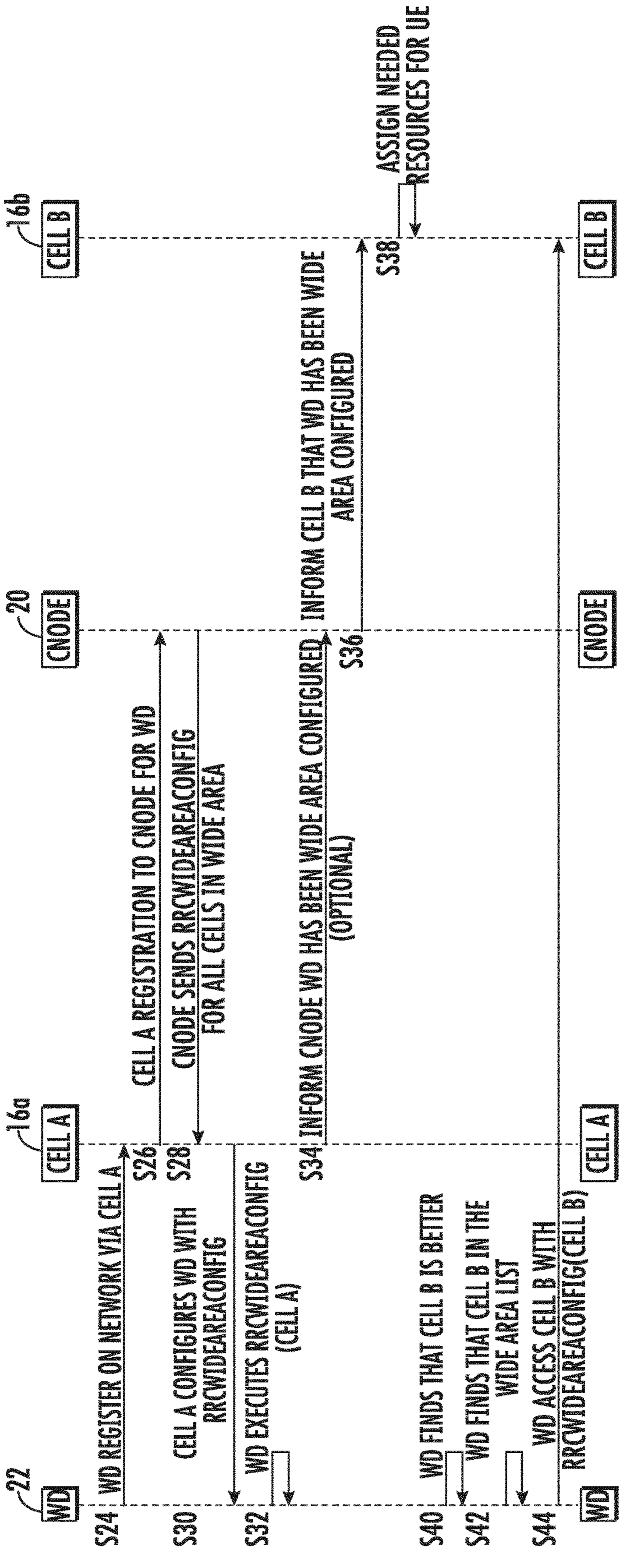
FIG. 11 shows a signaling exchange between a WD, a central network node and a plurality of cell network nodes.

In FIG. 11, a WD 22 is configured with an active wide-area configuration, i.e. an active RRCWideAreaConfiguration. Cell network node A 16 understands that the WD 22 has not registered to this area earlier and informs the central network node 20 (CNode). The central network node 20 holds the cell IDs for the wide area and sends this to cell network node A 16. Note that the complete RRCWideAreaReconfiguration can be done in the background after the current cell network node A 16 is configured.

The central network node 20 can be a controlling gNB or any other core or cell network node. The central network node 20 does not need to understand the RRCWideAreaConfiguration it receives from the cells; it may simply store the RRCWideAreaConfiguration for each cell.

An example sequence of communication exchanges between the WD 22, cell network nodes 16*a* and 16*b* and central network node 20 shown in FIG. 11 proceeds as follows. The WD 22 may register with the network via cell network node 16*a* (Step S24). The cell network node 16*a* may signal the central network node 20 indicating that the WD 22 has been registered (Step S26). The central network node 20 sends to the cell network node 16*a* the RRCWideAreaConfiguration IE for all cells in a wide area configuration of cells configured by the central network node 20 (Step S28). Then, the cell network node 16*a* configures the WD 22 in a cell A with the RRCWideAreaConfiguration information (Step S30). The WD 22 may then execute the RRCWideAreaConfiguration information to configure for the cell A (Step S32). Optionally, the cell network node 16*a* may inform the central network node 20 that the WD 22 has been configured for the wide area (Step S34). The central network 20 may inform the cell network node 16*b* that the WD 22 has been configured for the wide area (Step S36). In response, the cell network node 16*b* may assign resources for the WD 22 (Step S38). If the WD 22 finds that better signal reception occurs when receiving from the cell network node 16*b* (Step S40), and that the cell served by network node 16*b* is in a list of cells in the wide area configuration configured by the central network node 20 (Step S42), then the WD 22 accesses the cell served by network node 16*b* using the previously-received RRCWideAreaConfiguration information (Step S44).

Figure 12:
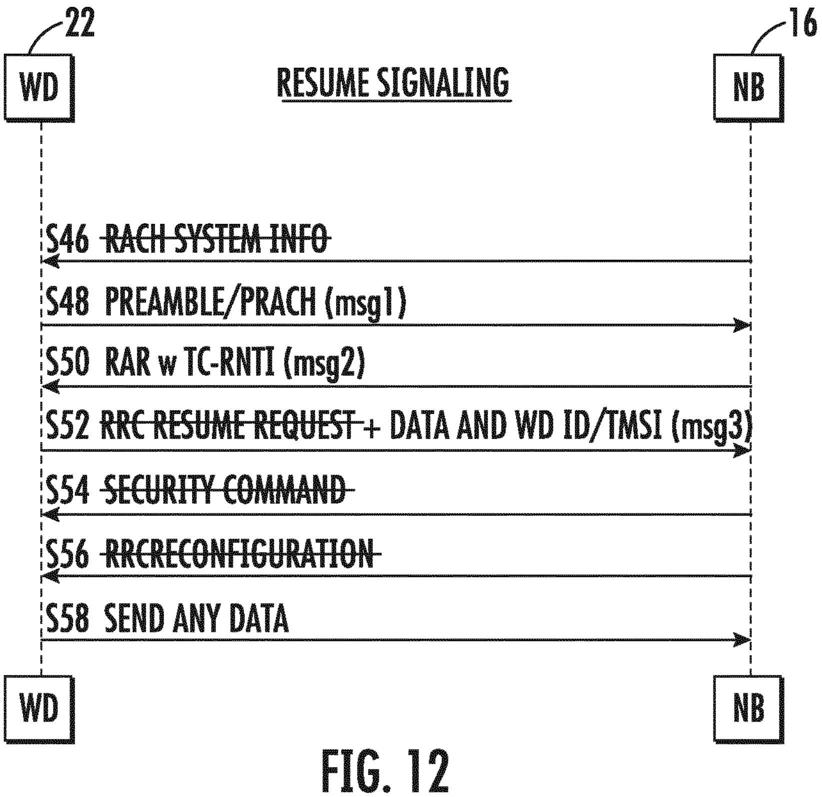
FIG. 12 shows a reduced signaling exchange between a WD and a cell network node for resuming a connection.
Figure 13:
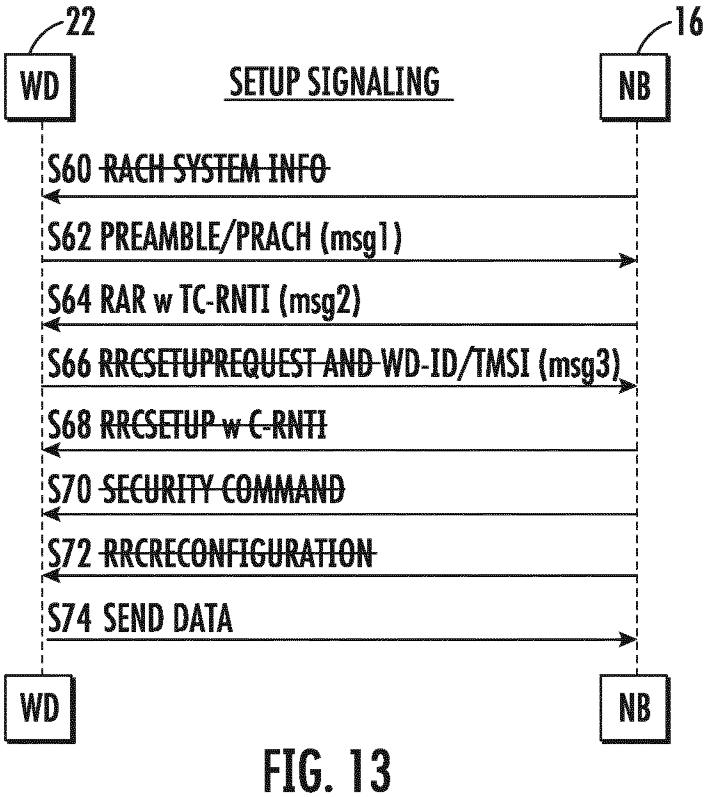
FIG. 13 shows a reduced signaling exchange between a WD and cell network node for setting up a connection.

FIG. 12 shows a faster resume time (top) and FIG. 13 shows a faster setup time from Idle (bottom) since the WD 22 can execute the RRCWideAreaConfiguration before accessing the cell. The crossed out text in FIGS. 12 and 13 shows the signaling that is rendered moot by some embodiments. Thus, in FIG. 12, the step of sending RACH system information from the cell network node 16 to the WD 22 (Step S46) may be omitted. Rather, the WD 22 may send the preamble/PRACH (msg1) to the cell network node 16 (Step S48) followed by receiving the RAR with TC-CNTRI (msg2) (Step S50). The WD 22 need not send an RRC resume request but may send data and WD ID/TMSI (msg3) (Step S52). The cell network node 16 may omit sending the security command (Step S54) and may omit sending the RRCReconfiguration (Step S56). This may then be followed by the WD 22 sending data to the cell network node 16 (Step S58).

Similarly, in some embodiments, setup signaling, as shown in FIG. 13, also enables the omission of some signaling. For example, the cell network node 16 may omit transmission of the RACH system information (Step S60). Rather, the WD 22 sends a preamble/PRACH (msg1) (Step S62). In response, the cell network node 16 sends the RAR with TC-RNTI (msg2) (Step S64). The WD 22 may omit transmission of an RRC setup request, but may send the WD-ID/TMSI (msg3) (Step S66). The cell network node 16 may omit transmission the RRCSetup with C-RNTI (Step S68), may omit transmission of the security command (Step S70), and may omit transmission of the RRCConfiguration (Step S72). Then, the WD 22 may transmit data to the cell network node 16 (Step S74).

Since the WD 22 can access cell network node B 16 with the existing configuration, the WD 22 only has to perform RACH access to achieve the timing advance and notify the new cell network node B 16 that the WD 22 enters the cell.

The msg 3 (or MsgA in the 2-step RA procedure) in FIGS. 12 and 13 may be a small message since it does not have to contain the large RRCResume or RRCSetupRequest messages. For the resume procedure, the message can simply contain data and a WD ID, and for the setup procedure, only the WD ID.

The cells a WD 22 should measure in RRCWideAreaConfiguration may include all cells in the active wide-area. In addition to this, the central network node 20 may include additional neighbor cells outside the wide area depending on the location of the WD 22. In other words, if the WD 22 is served by a cell which has a neighbor cell outside the wide area, this cell should also be measured since a (conventional) handover to this cell may occur.

Central Network Node 20 (CNode)

Figure 14:
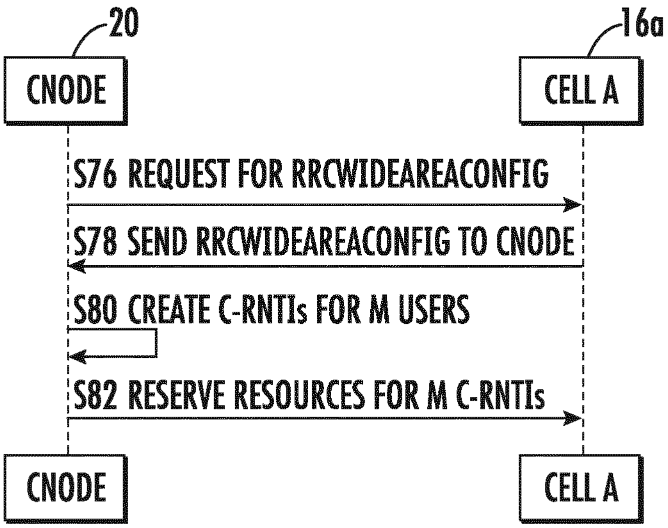
FIG. 14 shows a signaling exchange between a central network node and a cell network node.

When the wide area is configured, the central network node 20 (or optionally any other network node 16 or 20) sends a request for a cell network node's (general) RRC Configuration, i.e., the RRCWideAreaConfiguration for a cell. The cell network node 16 replies with at least sufficient RRCReconfiguration, RRCResume and RRCSetup IEs needed for the WD 22 to perform initial setup and handover to the cell, as shown in FIG. 14. FIG. 14 shows signaling from a central network node 20 to a cell network node 16 when a wide area is setup. The central node 20 may send a request for RRCWideAreaConfig information to the cell network node 16*a* (Step S76). The cell network node 16*a* may send a RRCWideAreaConfig to the central network node 20 (Step S78). The central network node 20 may create C-RNTIs for a number M of users (Step S80). The central network node 20 may send an instruction to the cell network node 16*a* to reserve resources for M number of C-RNTIs (Step S82).

The WD 22 configured with a wide area configuration may also need WD-specific configurations for the cells in an active wide area.

In some embodiments, the cell network node 16 also responds to a request from the central network node 20 (CNode) for the RRCWideareaconfiguration with WD-specific reserved resources (e.g., N different C-RNTIs) to be assigned to WDs 22 with this cell in the active wide area.

In some embodiments, the CNode 20 assigns these resources (e.g., N different C-RNTIs) and notifies the cell network node 16 which then reserves these resources for WDs 22 when a cell belongs to the active wide area of the WD 22.

In some embodiments, the CNode 20 assigns the same resources (e.g., specific C-RNTI) in a number of cells and assign these resources to the same WD 22. In this case, the size of the RRCWideareaconfiguration will be much smaller than if different configurations are assigned to the WD 22 in different cells, whereby the signaling overhead on Uu will be greatly reduced from known methods.

The extent to which resources should be reserved in the active wide area may be limited or reduced in one or more of the following ways:

- A dynamic configuration of which cells belong to the active wide area. The minimum set could be the neighbor cells of a current cell of the WD 22, in which case this would be similar to the resources occupied in CHO. Since it is not known which cell the WD 22 has selected during Idle/Inactive mode, statistical (or machine learning (ML) or artificial intelligence (AI)) analysis of the WD's typical movements may be performed. Many WDs 22 would have a very predictive pattern (home→work→home). In this way, the active wide area can be updated to only contain cells close to where the WD 22 is predicted to be;
- The number of WDs 22 that are given a wide are configuration may be restricted to WDs 22 with a limited or predicted movement. In this way, only WDs 22 with small active wide areas are configured; and
- Both of the above may depend on system load, so that when system is loaded, none or only a few WDs 22 are given a wide area configuration while when the system has low load, the number of WDs 22 given a wide area configuration can be more generous.

In some embodiments, some of the parameters described above as being WD-specific and being reserved in each cell are not reserved in all cells but instead exchanged during the random access procedure. As an example, C-RNTIs need not be reserved, but can be exchanged during the random access procedure as in legacy systems.

The active RRCWideAreaReconfiguration may not be deleted after a handover/resume/setup so it can be reused within the active wide area without any additional signaling being required (as would be the case for CHO after a CHO has been completed). Thus, the WD 22 also keeps the active RRCWideAreaReconfiguration when the WD 22 goes to IDLE as long as it remains in a cell within the active wide area. When the WD 22 makes a transition from IDLE to CONNECTED, the WD 22 can reuse the active RRCWideAreaReconfiguration for the RRC Setup, thereby reducing signaling overhead and achieving faster setup.

When a WD 22 leaves the wide area, the last serving cell network node 16 may inform the CNode 20 which can then inform all other cell network nodes 16 serving the area so that they can release all reserved resources. The WD 22 also removes the active wide-area configuration.

A WD 22 may send a request to obtain a wide area configuration. This may be useful in case the WD 22 does not have this when it initially enters the wide-area or if no wide-area configurations are available (due to a resource shortage), e.g., when the WD 22 enters the wide-area for the first time.

The WD capability may be taken into consideration when configuring the WD 22 with a RRCWideAreaReconfiguration or active RRCWideAreaReconfiguration, so that a WD 22 with low capability may either be not configured with a RRCWideAreaReconfiguration or active RRCWideAreaReconfiguration, or be configured with a small RRCWideAreaReconfiguration and a small active RRCWideAreaReconfiguration.

According to one aspect, a method in a central network node 20 in communication with a plurality of wireless devices, WDs, 22 via one or more cell network nodes 16 is provided. The method includes configuring a set of cells to be included in a wide area configuration for a WD 22. The method also includes sending a wide area cell configuration signal to the WD 22, the wide area cell configuration signal including configurations for each cell in a predefined wide area, the predefined wide area being a collection of cells, the configurations including setup, resume and hand over configurations and resource allocations for an active wide area including a subset of cells of the collection of cells of the predefined wide area.

According to this aspect, in some embodiments, the wide area cell configuration signal excludes resource reservations for cells in the predefined wide area that are not in the active wide area. In some embodiments, the subset of cells include neighboring cells, a neighboring cell being a cell which may be entered by the WD 22 directly from a current cell without the WD 22 entering another cell. In some embodiments, a plurality of cells in the set of cells have a same resource allocation. In some embodiments, a configuration for a cell is determined by a respective cell network node 16 serving the cell and received by the central network node 20 from the respective cell network node 16, for at least one cell in the set of cells. In some embodiments, configuring the set of cells includes determining whether to include a particular cell in the set of cells based at least in part on whether the particular cell is a neighboring cell of a current cell of the WD 22, a neighboring cell being a cell which may be entered by the WD 22 directly from a current cell without the WD 22 entering another cell. In some embodiments, configuring the set of cells includes determining whether to include a particular cell in the set of cells based at least in part on whether the particular cell is a cell where the WD 22 is predicted to be. In some embodiments, a number of cells included in the set of cells depends at least in part a number of WDs 22 having predictable movement to a limited set of locations. In some embodiments, a number of cells included in the set of cells depends at least in part on a number of WDs 22 being served by cell network nodes 16 serving the set of cells. In some embodiments, a number of cells included in the set of cells depends at least in part on a capability of the WD 22. In some embodiments, the method also includes comprising sending to at least one cell network node 16 an indication to release resources allocated to the WD 22 for an area served by a set of cell network nodes 16 serving the set of cells.

According to another aspect, a central network node 20 in communication with a plurality of wireless devices, WDs 22, via one or more cell network nodes 16, the central network node 20 including processing circuitry 37 configured to configure a set of cells to be included in a wide area configuration for a WD 22; and send a wide area cell configuration signal to the WD 22, the wide area cell configuration signal including configurations for each cell in a predefined wide area, the predefined wide area being a collection of cells, the configurations including setup, resume and hand over configurations and resource allocations for an active wide area including a subset of cells of the collection of cells of the predefined wide area.

According to this aspect, in some embodiments, the wide area cell configuration signal excludes resource reservations for cells in the predefined wide area that are not in the active wide area. In some embodiments, the subset of cells include neighboring cells, a neighboring cell being a cell which may be entered by the WD 22 directly from a current cell without the WD 22 entering another cell. In some embodiments, a plurality of cells in the set of cells have a same resource allocation. In some embodiments, a configuration for a cell is determined by a respective cell network node 16 serving the cell and received by the central network node 20 from the respective cell network node 16, for at least one cell in the set of cells. In some embodiments, configuring the set of cells includes determining whether to include a particular cell in the set of cells based at least in part on whether the particular cell is a neighboring cell of a current cell of the WD 22, a neighboring cell being a cell which may be entered by the WD 22 directly from a current cell without the WD 22 entering another cell. In some embodiments, configuring the set of cells includes determining whether to include a particular cell in the set of cells based at least in part on whether the particular cell is a cell where the WD 22 is predicted to be. In some embodiments, a number of cells included in the set of cells depends at least in part a number of WDs 22 having predictable movement to a limited set of locations. In some embodiments, a number of cells included in the set of cells depends at least in part on a number of WDs 22 being served by cell network nodes 16 serving the set of cells. In some embodiments, a number of cells included in the set of cells depends at least in part on a capability of the WD 22. In some embodiments, the processing circuitry 37 is further configured to send to at least one cell network node 16 an indication to release resources allocated to the WD 22 for an area served by a set of cell network nodes 16 serving the set of cells.

According to yet another aspect, a method in a cell network node 16, in communication with a central network node 20 and a wireless device, WD 22, is provided. The method includes: sending wide area cell configuration information to the central network node 20, the wide area cell configuration information including cell configurations for each cell in a predefined wide area. The method also includes receiving an indication whether the WD 22 is in a wide area cell configuration configured by the central network node 20. The method also includes, when the WD 22 is in the predefined wide area, configuring the WD 22 with wide area cell configuration information for each cell in the predefined wide area, the wide area cell configuration information including setup, resume and hand over configurations and resource allocations for an active wide area including a subset of cells of the predefined wide area.

According to this aspect, in some embodiments, the subset of cells include cells neighboring a current cell of the WD 22, a neighboring cell being a cell which may be entered by the WD 22 directly from the current cell without the WD 22 entering another cell. In some embodiments, the method also includes notifying the central network node 20 when the WD 22 enters a cell of the predefined wide area. In some embodiments, the method also includes determining a reduced message exchange for establishing and/or resuming communication with the WD 22 when the WD 22 enters or is within a cell of the predefined wide area. In some embodiments, the method also includes notifying the central network node 20 when the WD 22 leaves a cell of the predefined wide area.

According to another aspect, a cell network node 16, in communication with a central network node 20 and a wireless device, WD 22, is provided. The cell network node 16 includes a radio interface 30 configured to: send wide area cell configuration information to the central network node 20, the wide area cell configuration information including cell configurations for each cell in a predefined wide area; and receive an indication whether the WD 22 is in a wide area cell configuration configured by the central network node 20. The method also includes processing circuitry 36 configured to, when the WD 22 is in the predefined wide area, configure the WD 22 with wide area cell configuration information for each cell in the predefined wide area, the wide area cell configuration information including setup, resume and hand over configurations and resource allocations for an active wide area including a subset of cells of the predefined wide area.

According to this aspect, in some embodiments, the subset of cells include cells neighboring a current cell of the WD 22, a neighboring cell being a cell which may be entered by the WD 22 directly from the current cell without the WD 22 entering another cell. In some embodiments, the radio interface 30 is further configured to notify the central network node 20 when the WD 22 enters a cell of the predefined wide area. In some embodiments, the processing circuitry 36 is further configured to determine a reduced message exchange for establishing and/or resuming communication with the WD 22 when the WD 22 enters or is within a cell of the predefined wide area. In some embodiments, the radio interface 30 is further configured to notify the central network node 20 when the WD 22 leaves a cell of the predefined wide area.

According to yet another aspect, a method in a wireless device, WD 22, configured to communicate with a cell network node 16, the cell network node 16 being in communication with a central network node 20, is provided. The method includes receiving a cell configuration signal from the cell network node 16, the cell configuration signal including cell configuration information for each of a plurality of cells in a predefined wide area configured by the central network node 20; and storing the cell configuration information for use to establish or resume communication with the cell network node 16 or another cell network node 16 serving a cell of the plurality of cells in the predefined wide area as long as the WD 22 is connected to at least one of the cells in the predefined wide area.

According to this aspect, the method includes sending a request to obtain the cell configuration signal, wherein the cell configuration signal from the cell network node 16 is responsive to the request. In some embodiments, the method also includes using a reduced message set to establish or resume communication with a cell network node 16 serving a cell of the predefined wide area.

According another aspect, a wireless device, WD 22, configured to communicate with a cell network node 16, the cell network node 16 being in communication with a central network node 20, is provided. The WD 22 includes: a radio interface 46 configured to receive a cell configuration signal from the cell network node 16, the cell configuration signal including cell configuration information for each of a plurality of cells in a predefined wide area configured by the central network node 20; and processing circuitry 50 configured to store storing the cell configuration information for use to establish or resume communication with the cell network node 16 or another cell network node 16 serving a cell of the plurality of cells in the predefined wide area as long as the WD 22 is connected to at least one of the cells in the predefined wide area.

According to this aspect, the radio interface is further configured to send a request to obtain the cell configuration signal, wherein the cell configuration signal from the cell network node 16 is responsive to the request. In some embodiments, the processing circuitry 50 is further configured to use a reduced message set to establish or resume communication with a cell network node 16 serving a cell of the predefined wide area.

Abbreviations that may appear in this disclosure include the following:

3GPP Third Generation Partnership Project
5G Fifth Generation
ACK Acknowledgment
BWP Bandwidth Part
CE Control element
CG Configured Grant
CCA
Clear Channel Assessment
Downlink Control Information
DCI
DFI Downlink Feedback Information
gNB gNodeB
HARQ Hybrid Automatic Repeat Request
IE Information Element
LBT Listen Before Talk
LCH Logical Channel
LCG Logical Channel Group
LTE Long Term Evolution
MAC Media Access Control
MCS Modulation and Coding Scheme
NACK Negative Acknowledgement
NR New Radio
OFDM Orthogonal Frequency-Division Multiplexing
PMI Precoding Matrix Indicator
PUCCH Physical Uplink Control Channel
PUSCH Physical Uplink Shared Channel
QoS Quality of Service
RI Rank Indicator
RV Redundancy Version
RRC Radio Resource Control
RSRP Reference Signal Received Power
RSSI Received Signal Strength Indicator
RSRQ Reference Signal Received Quality
SCS Sub-Carrier Spacing
SI System Information
SG Scheduling Grant
SRI Sounding Reference Signals (SRS) Resource Indicator
SLIV Start and Length Indicator Value
TO Transmission Occasion
TDMA Time Division Multiple Access
UCI Uplink Control Information
UE User Equipment As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a central network node in communication with a plurality of wireless devices, WDs, via one or more cell network nodes, the method comprising:

determining a set of cells to be associated with a predefined wide area of a WD, the predefined wide area comprising a collection of cells;

configuring each cell in the set of cells of the predefined wide area with wide area cell configuration information for the WD, the wide area cell configuration information including setup, resume and handover configurations and resource allocations for an active wide area, the active wide area including a subset of the set of cells of the predefined wide area;

sending, a wide area cell configuration signal to the WD, the wide area cell configuration signal including the configuration information corresponding to the active wide area including the subset of the set of cells of the predefined wide area; and determining a reduced message exchange, based on the configuration information corresponding to the active wide area, for one or both establishing and resuming communication with the WD when the WD enters or is within a cell of the active wide area.

2. The method of claim 1, wherein the wide area cell configuration signal excludes resource reservations for cells in the predefined wide area that are not in the active wide area.

3. The method of claim 1, wherein the subset of cells include neighboring cells, a neighboring cell being a cell which may be entered by the WD directly from a current cell without the WD first entering another cell to maintain communication.

4. The method of claim 1, wherein a plurality of cells in the set of cells have a same resource allocation.

5. The method of claim 1, wherein a configuration for a cell is determined by a respective cell network node serving the cell and received by the central network node from the respective cell network node, for at least one cell in the set of cells.

6. The method of claim 1, wherein configuring the set of cells includes determining whether to include a particular cell in the set of cells based at least in part on whether the particular cell is a neighboring cell of a current cell of the WD, a neighboring cell being a cell which may be entered by the WD directly from a current cell without the WD first entering another cell to maintain communication.

7. The method of claim 1, wherein configuring the set of cells includes determining whether to include a particular cell in the set of cells based at least in part on whether the particular cell is a cell where the WD is predicted to be.

8. The method of claim 1, wherein a number of cells included in the set of cells depends at least in part a number of WDs having predictable movement to a limited set of locations.

9. The method of claim 1, wherein a number of cells included in the set of cells depends at least in part on a number of WDs being served by cell network nodes serving the set of cells.

10. The method of claim 1, wherein a number of cells included in the set of cells depends at least in part on a capability of the WD.

11. The method of claim 1, further comprising sending to at least one cell network node an indication to release resources allocated to the WD for an area served by a set of cell network nodes serving the set of cells.

12. A method in a cell network node, in communication with a central network node and a wireless device, WD, the method comprising:

receiving wide area cell configuration information from the central network node, the wide area cell configuration information including cell configurations for each cell in a predefined wide area;

receiving an indication that the WD has entered or is within a cell of the predefined wide area;

when the WD is in the predefined wide area, configuring the WD with a subset of the wide area cell configuration information corresponding to an active wide area including a subset of cells of the predefined wide area, the subset of the wide area cell configuration information including setup, resume and hand over configurations and resource allocations; and determining a reduced message exchange, based on the configuration information corresponding to the active wide area, for one or both establishing and resuming communication with the WD when the WD enters or is within a cell of the active wide area.

13. The method of claim 12, wherein the subset of cells include cells neighboring a current cell of the WD, a neighboring cell being a cell which may be entered by the WD directly from the current cell without the WD first entering another cell to maintain communication.

14. The method of claim 12, further comprising notifying the central network node when the WD enters a cell of the predefined wide area.

15. The method of claim 12, further comprising using a reduced message set for establishing and resuming communication with the WD when the WD enters or is within a cell of the active wide area.

16. The method of claim 12, further comprising notifying the central network node when the WD leaves a cell of the predefined wide area.

17. A method in a wireless device, WD, configured to communicate with a cell network node, the cell network node being in communication with a central network node, the method comprising:

receiving a wide area cell configuration signal from the cell network node, the wide area cell configuration signal including cell configuration information for each of a plurality of cells in a predefined wide area configured by the central network node, the cell configuration information including setup, resume and handover configurations and resource allocations for an active wide area, the active wide area including a subset of the plurality of cells of the predefined wide area;

storing the cell configuration information; and performing a reduced message exchange based on the stored cell configuration information to one or both establish and resume communication with the cell network node or another cell network node serving a cell of the subset of the plurality of cells in the predefined wide area as long as the WD is connected to at least one cell in the active wide area.

18. The method of claim 17, further comprising sending a request to obtain the cell configuration signal, wherein the cell configuration signal from the cell network node is responsive to the request.

19. The method of claim 17, further comprising using a reduced message set to establish or resume communication with a cell network node serving a cell of the predefined wide area.

20. A wireless device, WD, configured to communicate with a cell network node, the cell network node being in communication with a central network node, the WD comprising:

a radio interface configured to:

receive a wide area cell configuration signal from the cell network node, the wide area cell configuration signal including cell configuration information for each of a plurality of cells in a predefined wide area configured by the central network node, the cell configuration information including setup, resume and handover configurations and resource allocations for an active wide area including a subset of the plurality of cells of the predefined wide area; and processing circuitry configured to:

store the cell configuration information; and perform a reduced message exchange based on the stored cell configuration information to one or both establish and resume communication with the cell network node or another cell network node serving a cell of the subset of the plurality of cells in the predefined wide area as long as the WD is connected to at least one cell in the active wide area.

21. The WD of claim 20, wherein the radio interface is further configured to send a request to obtain the cell configuration signal, wherein the cell configuration signal from the cell network node is responsive to the request.

* * * * *